（12） United States Patent
Chen et al.

(10) Patent No.: US 12,452,946 B2
(45) Date of Patent: Oct. 21, 2025

(54) METHOD AND DEVICE FOR WIRELESS COMMUNICATION

(71) Applicant: BUNKER HILL TECHNOLOGIES LLC, Allen, TX (US)

(72) Inventors: Yu Chen, Shanghai (CN); Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 421 days.

(21) Appl. No.: 17/986,901

(22) Filed: Nov. 15, 2022

(65) Prior Publication Data

US 2023/0156844 A1 May 18, 2023

(30) Foreign Application Priority Data

Nov. 15, 2021 (CN) .......................... 202111344590.6

(51) Int. Cl.
H04W 36/00 (2009.01)
H04W 76/19 (2018.01)

(52) U.S. Cl.
CPC ....... H04W 76/19 (2018.02); H04W 36/0079 (2018.08); H04W 36/03 (2018.08)

(58) Field of Classification Search
CPC .............. H04W 56/005; H04W 56/00; H04W 72/1268; H04W 74/0833; H04W 74/0841; H04W 74/0866; H04W 74/08; H04W 72/12; H04W 4/06; H04W 76/40; H04W 64/00; H04W 52/0229; H04W 52/0235; H04W 68/025; H04W 76/28; H04W 24/10; H04W 52/0206; H04W 52/0216; H04W 52/0232; H04W 64/006; H04W 8/24; H04W 52/02; G01S 13/003; G01S 13/765; G01S 13/767; G01S 13/87; G01S 13/00;

(Continued)

(56) References Cited

U.S. PATENT DOCUMENTS 11,849,363 B2 * 12/2023 Tsuboi .............. H04W 36/0044
2018/0070327 A1 3/2018 Qureshi et al.
(Continued)

FOREIGN PATENT DOCUMENTS

CN 109417695 A 3/2019
CN 112436925 A 3/2021
(Continued)

OTHER PUBLICATIONS

"3rd Generation Partnership Project; Technical Specification Group Radio Access Network; NR; Physical channels and modulation (Release 16)", 3GPP, 3rd Generation Partnership Project, 3GPP TS 38.211 V16.5.0 (Mar. 2021), Technical Specification, 134 pgs, Mar. 2021.

(Continued)

Primary Examiner — Nathan S Taylor
(74) Attorney, Agent, or Firm — Ascenda Law Group, PC

(57) ABSTRACT

A first signaling is received, the first signaling being used to indicate a transition from a first radio link to a second radio link. The first radio link is a direct path. The first signaling is used for configuring a first timer. In response to expiration of the first timer, a radio link handover failure is determined and an RRC re-establishment is initiated. A first message is transmitted. The reception of the first signaling can help with network optimization.

20 Claims, 7 Drawing Sheets

(58) Field of Classification Search
CPC ....... G01S 13/76; G01S 5/02; H04L 43/0864; H04L 1/0003; H04L 1/0009; H04L 1/0026; H04L 1/1816; H04L 1/1822; H04L 1/1861; H04L 12/1868; H04L 2001/0093; H04L 5/0055; H04L 1/18; H04L 5/00; H04L 5/0048; H04L 5/0053
See application file for complete search history.

(56) References Cited

U.S. PATENT DOCUMENTS

| | | | | |
|---|---|---|---|---|
| 2022/0007255 | A1* | 1/2022 | Rugeland | H04W 76/19 |
| 2022/0167408 | A1* | 5/2022 | Lee | H04W 74/0808 |
| 2022/0201582 | A1* | 6/2022 | Eklöf | H04W 24/08 |
| 2022/0210701 | A1* | 6/2022 | Jung | H04W 36/0079 |
| 2022/0264414 | A1* | 8/2022 | Hu | H04W 76/20 |
| 2022/0361275 | A1* | 11/2022 | Da Silva | H04W 76/18 |
| 2022/0386204 | A1* | 12/2022 | Parichehrehteroujeni | H04W 24/08 |
| 2023/0040285 | A1* | 2/2023 | Parichehrehteroujeni | H04W 36/0079 |
| 2023/0126466 | A1* | 4/2023 | Pan | H04W 76/23 455/11.1 |
| 2023/0164658 | A1* | 5/2023 | Ishii | H04W 36/0055 370/331 |
| 2023/0262546 | A1* | 8/2023 | Teyeb | H04W 36/0069 370/331 |
| 2023/0269647 | A1* | 8/2023 | Ramachandra | H04W 36/0079 370/331 |
| 2023/0284312 | A1* | 9/2023 | Parichehrehteroujeni | H04W 76/27 370/216 |
| 2023/0292205 | A1* | 9/2023 | Ramachandra | H04W 24/02 |
| 2023/0370933 | A1* | 11/2023 | Kim | H04W 24/10 |
| 2023/0388204 | A1* | 11/2023 | Ramachandra | H04L 43/0805 |
| 2023/0397080 | A1* | 12/2023 | Parichehrehteroujeni | H04W 36/08 |
| 2024/0137830 | A1* | 4/2024 | Parichehrehteroujeni | H04W 36/305 |
| 2024/0163746 | A1* | 5/2024 | Belleschi | H04W 36/0079 |
| 2024/0172062 | A1* | 5/2024 | Ramachandra | H04W 36/00833 |
| 2024/0340724 | A1* | 10/2024 | Ramachandra | H04W 74/0833 |
| 2024/0340988 | A1* | 10/2024 | Da Silva | H04W 76/19 |
| 2024/0388973 | A1* | 11/2024 | Belleschi | H04W 36/00838 |
| 2025/0048195 | A1* | 2/2025 | Ramachandra | H04W 36/0058 |

FOREIGN PATENT DOCUMENTS

| | | | |
|---|---|---|---|
| CN | 112867027 A | 5/2021 | |
| WO | 2019028812 A1 | 2/2019 | |
| WO | WO-2021030674 A1 * | 2/2021 | .......... H04W 52/146 |
| WO | 2021212730 A1 | 10/2021 | |
| WO | WO-2021207567 A1 * | 10/2021 | .......... H04B 17/102 |
| WO | WO-2022031196 A1 * | 2/2022 | |
| WO | WO-2023075657 A1 * | 5/2023 | ........ H04W 36/0058 |

OTHER PUBLICATIONS

"3rd Generation Partnership Project; Technical Specification Group Radio Access Network; NR; Physical layer procedures for control (Release 16)", 3GPP, 3rd Generation Partnership Project, 3GPP TS 38.213 V16.5.0 (Mar. 2021), Technical Specification, 183 pgs, Mar. 2021.

"3rd Generation Partnership Project; Technical Specification Group Radio Access Network; NR; User Equipment (UE) procedures in Idle mode and RRC Inactive state (Release 16)", 3rd Generation Partnership Project, 3GPP TS 38.304 V16.4.0 (Mar. 2021), Technical Specification, 39 pgs, Mar. 2021.

"3rd Generation Partnership Project; Technical Specification Group Radio Access Network; NR; Radio Resource Control (RRC) protocol specification (Release 16)", 3GPP, 3rd Generation Partnership Project, 3GPP TS 38.331 V16.5.0 (Jun. 2021), Technical Specification, 959 pgs, Jun. 2021.

"Summary of AI 8.7.2.2 Service continuity", Huawei, HiSilicon, 3GPP TSG-RAN WG2 Meeting #116 electronic, R2-2111276, Electronic meeting, Nov. 1-12, 2021, 21 pgs.

"Discussion on service continuity for L2 UE to NW Relay", Huawei, HiSilicon, 3GPP TSG-RAN WG2 Meeting #115-e, R2-2108622, Online, Aug. 9-Aug. 27, 2021, 9 pgs.

"Service continuity for L2 relay", CMCC, 3GPP TSG-WG2 Meeting #116 electronic, R2-2111042, Online, Nov. 1-11, 2021, 3 pgs.

First Office Action dated May 1, 2025, from the CN State Intellectual Property Office, for CN Application No. 202111344590.6, 6 pgs.

Search Report dated Apr. 25, 2025, from the CN State Intellectual Property Office, for CN Application No. 202111344590.6, 6 pgs.

* cited by examiner (a)

(b)

METHOD AND DEVICE FOR WIRELESS COMMUNICATION

CROSS REFERENCE TO RELATED APPLICATIONS

This application claims the priority benefit of Chinese Patent Application No. 202111344590.6, filed on Nov. 15, 2021, the full disclosure of which is incorporated herein by reference.

BACKGROUND

Technical Field

The present application relates to transmission methods and devices in wireless communication systems, in particular to a method and device for reducing traffic interruptions, enhancing traffic continuity and optimizing network in sidelink relay communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

In communications, both Long Term Evolution (LTE) and 5G NR involves correct reception of reliable information, optimized energy efficiency ratio (EER), determination of information validity, flexible resource allocation, elastic system structure, effective information processing on non-access stratum (NAS), and lower traffic interruption and call drop rate, and support to lower power consumption, which play an important role in the normal communication between a base station and a User Equipment (UE), rational scheduling of resources, and also in the balance of system payload, thus laying a solid foundation for increasing throughput, meeting a variety of traffic needs in communications, enhancing the spectrum utilization and improving service quality. Therefore, LTE and 5G are indispensable no matter in enhanced Mobile BroadBand (eMBB), Ultra Reliable Low Latency Communication (URLLC) or enhanced Machine Type Communication (eMTC). And a wide range of requests can be found in terms of Industrial Internet of Things (IIoT), Vehicular to X (V2X), and Device to Device (D2D), Unlicensed Spectrum communications, and monitoring on UE communication quality, network plan optimization, Non Terrestrial Network (NTN) and Terrestrial Network (TN), Dual connectivity system, or combined, radio resource management and multi-antenna codebook selection, as well as signaling design, neighbor management, traffic management and beamforming. Information is generally transmitted by broadcast and unicast, and both ways are beneficial to fulfilling the above requests and make up an integral part of the 5G system. The UE's connection with the network can be achieved directly or by relaying.

As the number and complexity of system scenarios increases, more and more requests have been made on reducing interruption rate and latency, strengthening reliability and system stability, increasing the traffic flexibility and power conservation, and in the meantime the compatibility between different versions of systems shall be taken into account for system designing.

The 3GPP standardization organization has worked on 5G standardization to formulate a series of specifications such as 38.304, 38.211, and 38.213.

SUMMARY

The relay can be used in various communication scenarios, for instance, when a UE is not within coverage of a cell, it can be accessible to the network via the relay, where the relay node can be another UE. The relay generally includes L3 relay and L2 U2N relay, both of which provide the service of access to the network for a U2N remote UE via a relay node. The L3 relay is transparent to the access network, namely, a remote UE only establishes connection with the core network, so the access network cannot recognize whether data is from a remote node or a relay node; as for the L2 U2N relay, there is an RRC connection between a U2N remote UE and a Radio Access Network (RAN); the RAN can manage the remote UE and between them a radio bearer (RB) can be established. The relay can be another UE. In a system supporting L2 relay, the UE can be in communication with the network via a L2 U2N relay UE, that is, to use an indirect path, or can be directly in communication with the network without being relayed, that is, to use a direct path. In some cases, for example when the signal of network becomes weaker, a remote UE can switch from a direct path to an indirect path; after the signal gets better, it can then switch from the indirect path to a direct path. The switch of path is a radio link handover, if a radio link handover is failed, the network needs to log and analyze its cause of failure for the benefit of network optimization. To ensure more precise optimization, it is required to understand the situation of the radio link, especially about whether it is switched to an indirect path or a direct path. More specifically, when the relay is used, for a remote node the signal from a target cell may be weak or even out of coverage. If the network is not aware that a target cell switched to is transmitting via the indirect path, it will assume that the decision it made before is to switch directly from a source cell to a target cell with poor signal, and thus will optimize focused on certain switch control parameters, for instance, a handover threshold. But this kind of optimization is wrong, and worse still, will lead to severe problems. Since the handover at that time is performed with the indirect path, the quality of a radio link from the relay to the target cell can be very good, so the handover failure probably results from some trouble in sidelink communication. Therefore, there is no need to optimize for switch parameters of the direct path, at least not to optimize for the switch of the direct path. Therefore, the issue to be solved in the present application includes how to report appropriate information of failure to assist the network in optimization work in relay-using scenarios.

To address the problem presented above, the present application provides a solution.

It should be noted that if no conflict is incurred, embodiments in any node in the present application and the characteristics of the embodiments are also applicable to any other node, and vice versa. What's more, the embodiments in the present application and the characteristics in the embodiments can be arbitrarily combined if there is no conflict.

The present application provides a method in a first node for wireless communications, comprising:

receiving a first signaling, the first signaling being used to indicate a transition from a first radio link to a second radio link; the first radio link is a direct path; the first signaling is used for configuring a first timer;

in response to expiration of the first timer, determining a radio link handover failure and initiating an RRC re-establishment; and transmitting a first message;

herein, a format of the first message and the first timer are respectively related to whether the second radio link is a direct path or an indirect path; the first signaling is an RRC message using an SRB; the first message is an RRC message using an SRB; the first message comprises at least a first identity; transmitting the first message is later than the expiration of the first timer; when the second radio link is a direct path, the first message uses a first format, when the second radio link is an indirect path, the first message uses a second format; the first format and the second format are respectively used to indicate the radio link handover failure (HOF); the indirect path is in communication with the network via relay; the direct path is in communication with the network without relay; when the second radio link is a direct path, the first timer is T304, when the second radio link is an indirect path, the first timer is a timer other than T304.

In one embodiment, a problem to be solved in the present application includes: How to report failure information properly to the network to facilitate network optimization when confronted with radio link handover failure (HOF) in scenarios using L2 relay.

In one embodiment, an advantage of the above method includes: Avoiding misunderstanding that is potentially generated as the network is processing information of the radio link HOF; with L2 relay being supported, the communication interruptions can be reduced and the service quality is enhanced, thus giving better support to mobility and service continuity.

Specifically, according to one aspect of the present application, the second format of the first message indicates that the radio link handover failure is related to relay.

Specifically, according to one aspect of the present application, the first signaling comprises reconfigurationWithSync field.

Specifically, according to one aspect of the present application, in response to the expiration of the first timer, store first failure information in a first variable; the first variable is used for generating the first message; the first failure information is information about the radio link handover failure (HOF).

Specifically, according to one aspect of the present application, the second radio link is an indirect path; the second format of the first message comprises first failure information, the first failure information comprising at least one of {a first failure cause, an identity of a first relay, a measurement result of a first relay, a state of a first relay, an indication of whether a PC5 connection is established to a first relay, an indication of whether an RRC connection is established to a first relay, a state of a second timer, a measurement result of a serving cell of a first relay, a cause for expiration of the first timer, whether a sidelink communication failure related to a first relay occurs};

where the first failure cause is a cause other than RLF or HOF; the first relay is a relay comprised in the second radio link indicated by the first signaling.

Specifically, according to one aspect of the present application, the second format of the first message does not comprise a nrFailedPCellId field, and the second format of the first message not comprising the nrFailedPCellId field is used for indicating that the radio link HOF is related to relay.

Specifically, according to one aspect of the present application, the second radio link is an indirect path; the second format of the first message comprises a nrFailedPCellId field, and the nrFailedPCellId field comprised in the second format of the first message indicates an identity of a first relay, the first relay being a relay comprised in the second radio link indicated by the first signaling.

Specifically, according to one aspect of the present application, the first format and the second format of the first message both comprise a first field, the first field indicating a HOF, and the second format of the first message comprises a second field, the second field being used to indicate that the radio link HOF is related to relay; the first format of the first message does not comprise the second field.

Specifically, according to one aspect of the present application, the first node is a UE.

Specifically, according to one aspect of the present application, the first node is a terminal of Internet of Things (IoT).

Specifically, according to one aspect of the present application, the first node is a relay.

Specifically, according to one aspect of the present application, the first node is a U2N remote UE.

Specifically, according to one aspect of the present application, the first node is a vehicle-mounted terminal.

Specifically, according to one aspect of the present application, the first node is an aircraft.

The present application provides a method in a first node for wireless communications, comprising:

transmitting a first signaling, the first signaling being used to indicate a transition from a first radio link to a second radio link; the first radio link is a direct path; the first signaling is used for configuring a first timer;

a receiver of the first signaling, in response to expiration of the first timer, determining a radio link handover failure and initiating an RRC re-establishment; and receiving a first message;

herein, a format of the first message and the first timer are respectively related to whether the second radio link is a direct path or an indirect path; the first signaling is an RRC message using an SRB; the first message is an RRC message using an SRB; the first message comprises at least a first identity; transmitting the first message is later than the expiration of the first timer; when the second radio link is a direct path, the first message uses a first format, when the second radio link is an indirect path, the first message uses a second format; the first format and the second format are respectively used to indicate the radio link handover failure (HOF); the indirect path is in communication with the network via relay; the direct path is in communication with the network without relay; when the second radio link is a direct path, the first timer is T304, when the second radio link is an indirect path, the first timer is a timer other than T304.

Specifically, according to one aspect of the present application, the second format of the first message indicates that the radio link handover failure is related to relay.

Specifically, according to one aspect of the present application, the first signaling comprises reconfigurationWithSync field.

Specifically, according to one aspect of the present application, the second radio link is an indirect path; the second format of the first message comprises first failure information, the first failure information comprising at least one of {a first failure cause, an identity of a first relay, a measurement result of a first relay, a state of a first relay, an indication of whether a PC5 connection is established to a first relay, an indication of whether an RRC connection is established to a first relay, a state of a second timer, a measurement result of a serving cell of a first relay, a cause for expiration of the first timer, whether a sidelink communication failure related to a first relay occurs};

where the first failure cause is a cause other than RLF or HOF; the first relay is a relay comprised in the second radio link indicated by the first signaling.

Specifically, according to one aspect of the present application, the second format of the first message does not comprise a nrFailedPCellId field, and the second format of the first message not comprising the nrFailedPCellId field is used for indicating that the radio link HOF is related to relay.

Specifically, according to one aspect of the present application, the second radio link is an indirect path; the second format of the first message comprises a nrFailedPCellId field, and the nrFailedPCellId field comprised in the second format of the first message indicates an identity of a first relay, the first relay being a relay comprised in the second radio link indicated by the first signaling.

Specifically, according to one aspect of the present application, the first format and the second format of the first message both comprise a first field, the first field indicating a HOF, and the second format of the first message comprises a second field, the second field being used to indicate that the radio link HOF is related to relay; the first format of the first message does not comprise the second field.

Specifically, according to one aspect of the present application, transmitting a second message, the second message being used to indicate the radio link handover failure (HOF).

Specifically, according to one aspect of the present application, the second node is a base station.

Specifically, according to one aspect of the present application, the second node is a relay.

Specifically, according to one aspect of the present application, the second node is an aircraft.

Specifically, according to one aspect of the present application, the second node is a satellite.

Specifically, according to one aspect of the present application, the second node is an access-point device.

The present application provides a first node for wireless communications, comprising:

a first receiver, receiving a first signaling, the first signaling being used to indicate a transition from a first radio link to a second radio link; the first radio link is a direct path; the first signaling is used for configuring a first timer;

the first receiver, in response to expiration of the first timer, determining a radio link handover failure and initiating an RRC re-establishment; and a first transmitter, transmitting a first message;

herein, a format of the first message and the first timer are respectively related to whether the second radio link is a direct path or an indirect path; the first signaling is an RRC message using an SRB; the first message is an RRC message using an SRB; the first message comprises at least a first identity; transmitting the first message is later than the expiration of the first timer; when the second radio link is a direct path, the first message uses a first format, when the second radio link is an indirect path, the first message uses a second format; the first format and the second format are respectively used to indicate the radio link handover failure (HOF); the indirect path is in communication with the network via relay; the direct path is in communication with the network without relay; when the second radio link is a direct path, the first timer is T304, when the second radio link is an indirect path, the first timer is a timer other than T304.

The present application provides a second node for wireless communications, comprising:

a second transmitter, transmitting a first signaling, the first signaling being used to indicate a transition from a first radio link to a second radio link; the first radio link is a direct path; the first signaling is used for configuring a first timer;

a receiver of the first signaling, in response to expiration of the first timer, determining a radio link handover failure and initiating an RRC re-establishment; and a second receiver, receiving a first message;

herein, a format of the first message and the first timer are respectively related to whether the second radio link is a direct path or an indirect path; the first signaling is an RRC message using an SRB; the first message is an RRC message using an SRB; the first message comprises at least a first identity; transmitting the first message is later than the expiration of the first timer; when the second radio link is a direct path, the first message uses a first format, when the second radio link is an indirect path, the first message uses a second format; the first format and the second format are respectively used to indicate the radio link handover failure (HOF); the indirect path is in communication with the network via relay; the direct path is in communication with the network without relay; when the second radio link is a direct path, the first timer is T304, when the second radio link is an indirect path, the first timer is a timer other than T304.

In one embodiment, compared with the prior art, the present application is advantageous in the following aspects:

Supporting relay, particularly network optimization when using a L2 U2N relay UE, for instance, providing plenty of information about the relay usage to the network.

Indicating to the network appropriate failure information after a radio link HOF so as to assist in network optimizing to avoid false determination or incorrect optimization Various timers are used for specific occasions of radio link handovers, which is beneficial to streamlined network designing and reduced complexity and can avoid mutual interference.

Indicating to the network failure information in different cases, for example, indicating to the network failure information only based on the failure in an AS, thus preventing the network from optimizing the AS for the sake of failure in terms of NAS, such as PC5 connection establishment failure, which is meaningless, let alone ineffective.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
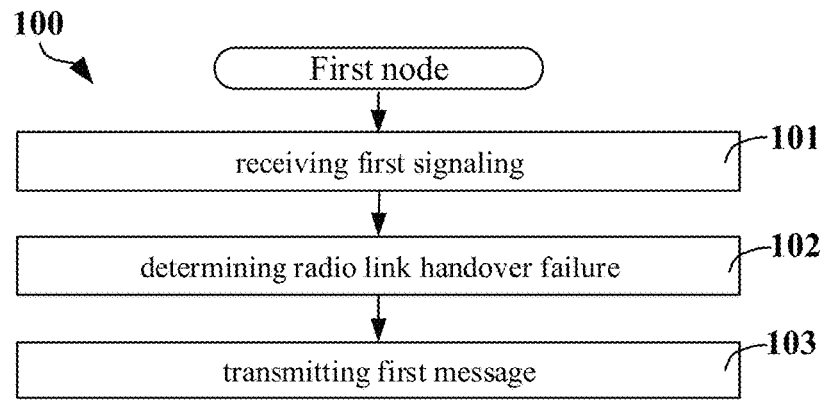
FIG. 1 illustrates a flowchart of receiving a first signaling, determining a radio link handover failure and transmitting a first message according to one embodiment of the present application.

Embodiment 1 illustrates a flowchart of receiving a first signaling, determining a radio link handover failure and transmitting a first message according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, the first node in the present application receives a first signaling in step 101; determines a radio link handover failure in step 102; and transmits a first message in step 103;

herein, the first signaling is used to indicate a transition from a first radio link to a second radio link; the first radio link is a direct path; the first signaling is used for configuring a first timer; the first node, in response to expiration of the first timer, determines a radio link handover failure and initiates an RRC re-establishment; and a format of the first message and the first timer are respectively related to whether the second radio link is a direct path or an indirect path; the first signaling is an RRC message using an SRB; the first message is an RRC message using an SRB; the first message comprises at least a first identity; transmitting the first message is later than the expiration of the first timer; when the second radio link is a direct path, the first message uses a first format, when the second radio link is an indirect path, the first message uses a second format; the first format and the second format are respectively used to indicate the radio link handover failure (HOF); the indirect path is in communication with the network via relay; the direct path is in communication with the network without relay; when the second radio link is a direct path, the first timer is T304, when the second radio link is an indirect path, the first timer is a timer other than T304.

In one embodiment, the first node is a User Equipment (UE).

In one embodiment, the direct path refers to a UE-to-Network (U2N) transmission path, so transmitting through the direct path means that data is transmitted without being relayed between a remote UE and the network in U2N transmission.

In one subembodiment, the data comprises higher-layer data and signaling

In one subembodiment, the data comprises an RRC signaling

In one subembodiment, the data comprises a bit string or a bit block.

In one subembodiment, the data only comprises signaling or data borne by a radio bearer (RB).

In one embodiment, the indirect path refers to a UE-to-Network (U2N) transmission path, so transmitting through the indirect path means that data is forwarded by a U2N relay UE between a remote UE and the network in U2N transmission.

In one subembodiment, the data comprises higher-layer data and signaling

In one subembodiment, the data comprises an RRC signaling

In one subembodiment, the data comprises a bit string or a bit block.

In one subembodiment, the data only comprises signaling or data borne by a radio bearer (RB).

In one embodiment, a radio link is either the direct path or the indirect path.

In one embodiment, a U2N relay UE refers to a UE providing the function of supporting connections between a U2N remote UE and the network.

In one embodiment, a U2N remote UE refers to a UE that needs to be relayed by a U2N relay UE in communications with the network.

In one embodiment, a U2N remote UE refers to a UE that needs to be relayed by a U2N relay UE in communications with the network.

In one embodiment, a U2N remote UE refers to a UE in communications with the network that supports relaying traffics.

In one embodiment, a U2N relay is a U2N relay UE.

In one embodiment, when transmitting to and receiving from the network unicast traffics, the U2N relay and the U2N remote node are both in an RRC connected state.

In one embodiment, when the U2N remote UE is in an RRC Idle state or an RRC Inactive state, the U2N relay UE can be in any RRC state, i.e., RRC Connected state, RRC Idle state or RRC Inactive state.

In one embodiment, not transmitting through a direct path is equivalent to transmitting through an inactive path.

In one embodiment, not transmitting through a direct path includes transmitting via a relay.

In one embodiment, transmitting through a direct path is or includes not transmitting via a relay.

In one embodiment, transmitting through a direct path is or includes not forwarding via a relay.

In one embodiment, the U2N relay UE is a UE providing the functionality of supporting connectivity to the network for the U2N remote UE.

In one subembodiment, the U2N relay UE is a UE.

In one subembodiment, the U2N relay UE provides the U2N remote UE with the service of relay to the network.

In one embodiment, the U2N remote UE is a UE in communication with the network via the U2N relay UE.

In one embodiment, a direct mode is a mode using the direct path.

In one embodiment, the direct mode is a mode in which a U2N remote UE is in communication with the network using the direct path.

In one embodiment, the direct mode is a mode in which a U2N remote UE transmits an RRC signaling or establishes an RRC connection to the network using the direct path.

In one embodiment, an indirect mode is a mode using the indirect path.

In one embodiment, the indirect mode is a mode using the indirect path.

In one embodiment, the indirect mode is a mode in which a U2N remote UE is in communication with the network using the indirect path.

In one embodiment, the indirect mode is a mode in which a U2N remote UE transmits an RRC signaling or establishes an RRC connection to the network using the indirect path In one embodiment, a serving cell is or includes a cell that the UE is camped on. Performing cell search includes that the UE searches for a suitable cell for a selected Public Land Mobile Network (PLMN) or a Stand-alone Non-Public Network (SNPN), selects the suitable cell to provide available services, and monitors a control channel of the suitable cell, where the whole procedure is defined to be camped on the cell; in other words, relative to this UE, the cell being camped on is seen as a serving cell of the UE. Being camped on a cell in either RRC Idle state or RRC Inactive state is advantageous in the following aspects: enabling the UE to receive system information from a PLMN or an SNPN; after registration, if a UE hopes to establish an RRC connection or resumes a suspended RRC connection, the UE can perform an initial access on a control channel of the camped cell to achieve such purpose; the network can page the UE; so that the UE can receive notifications from the Earthquake and Tsunami Warning System (ETWS) and the Commercial Mobile Alert System (CMAS).

In one embodiment, for a U2N remote node, a serving cell is or includes a cell which the U2N relay is camped on or is connected with.

In one embodiment, for a UE in RRC connected state without being configured with carrier aggregation/dual connectivity (CA/DC), there is only one serving cell that comprises a master cell. For a UE in RRC connected state that is configured with carrier aggregation/dual connectivity (CA/DC), a serving cell is used for indicating a cell set comprising a Special Cell (SpCell) and all secondary cells. A Primary Cell is a cell in a Master Cell Group (MCG), i.e., an MCG cell, working on the primary frequency, and the UE performs an initial connection establishment procedure or initiates a connection re-establishment on the Primary Cell. For dual connectivity (DC) operation, a special cell refers to a Primary Cell (PCell) in an MCG or a Primary SCG Cell (PSCell) in a Secondary Cell Group (SCG); otherwise, the special cell refers to a PCell.

In one embodiment, working frequency of a Secondary Cell (SCell) is secondary frequency.

In one embodiment, separate contents in information elements (IEs) are called fields.

In one embodiment, Multi-Radio Dual Connectivity (MR-DC) refers to dual connectivity with E-UTRA and an NR node, or between two NR nodes.

In one embodiment, in MR-DC, a radio access node providing a control plane connection to the core network is a master node, where the master node can be a master eNB, a master ng-eNB or a master gNB.

In one embodiment, an MCG refers to a group of serving cells associated with a master node in MR-DC, including a SpCell, and optionally, one or multiple SCells.

In one embodiment, a PCell is a SpCell of an MCG.

In one embodiment, a PSCell is a SpCell of a sCG.

In one embodiment, in MR-DC, a radio access node not providing a control plane connection to the core network but providing extra resources for the UE is a secondary node. The secondary node can be an en-gNB, a secondary ng-eNB or a secondary gNB.

In one embodiment, in MR-DC, a group of serving cells associated with a secondary node is a secondary cell group (SCG), including a SpCell and, optionally, one or multiple SCells.

In one embodiment, an Access Stratum (AS) functionality that enables Vehicle-to Everything (V2X) communications defined in 3GPP TS 23.285 is V2X sidelink communication, where the V2X sidelink communication occurs between nearby UEs, using E-UTRA techniques but not traversing network nodes.

In one embodiment, an Access Stratum (AS) functionality that at least enables Vehicle-to Everything (V2X) communications defined in 3GPP TS 23.287 is NR sidelink communication, where the NR sidelink communication occurs between two or more nearby UEs, using NR technology but not traversing network nodes.

In one embodiment, the sidelink refers to a UE-to-UE direct communication link that uses sidelink resource allocation mode, a physical signal or channel, and physical layer procedures.

In one embodiment, not being or not located within coverage is equivalent to being out of coverage.

In one embodiment, being within coverage is equivalent to being covered.

In one embodiment, being out of coverage is equivalent to being uncovered.

In one embodiment, the first node is a U2N remote node.

In one embodiment, PDCP entities corresponding to radio bearers (RBs) terminated between a UE and the network are respectively located within the UE and the network.

In one embodiment, the direct path refers to a direct path or communication link or channel or bearer used for the direct-link transmission.

In one embodiment, the direct-path transmission means that data borne by at least one Signaling radio bearer (SRB) between the UE and network does not go through relaying or forwarding of other nodes.

In one embodiment, the direct-path transmission means that RLC bearers associated with at least one Signaling radio bearer (SRB) between the UE and network are respectively terminated at the UE and the network.

In one embodiment, the direct-path transmission means that RLC entities associated with at least one Signaling radio bearer (SRB) between the UE and network are respectively terminated at the UE and the network.

In one embodiment, the direct-path transmission means that there is a direct communication link between the UE and the network.

In one embodiment, the direct-path transmission means that there is a Uu interface between the UE and the network.

In one embodiment, the direct-path transmission means that there is a MAC layer of a Uu interface, and the MAC layer of the Uu interface carries an RRC signaling.

In one embodiment, the direct-path transmission means that there is a physical layer of a Uu interface between the UE and the network.

In one embodiment, the direct-path transmission means that there is a logical channel and/or a transport channel between the UE and the network.

In one embodiment, the indirect path refers to an indirect path or communication link or channel or bearer used for the indirect-link transmission.

In one embodiment, the indirect-path transmission means that at least Signaling radio bearer (SRB)-borne data between the UE and network goes through relaying or forwarding of other nodes.

In one embodiment, the indirect-path transmission means that at least Signaling radio bearer (SRB)-associated RLC bearers between the UE and network are respectively terminated at the UE and the other node, as well as the other node and the network.

In one embodiment, the indirect-path transmission means that at least Signaling radio bearer (SRB)-associated RLC entities between the UE and network are respectively terminated at the UE and the other node, as well as the other node and the network.

In one embodiment, the indirect-path transmission means that there is no direct communication link between the UE and the network.

In one embodiment, the indirect-path transmission means that there isn't a physical layer of a Uu interface between the UE and the network.

In one embodiment, the indirect-path transmission means that there isn't a physical layer of a Uu interface between the UE and the network.

In one embodiment, the indirect-path transmission means that there is neither a logical channel nor a transport channel between the UE and the network.

In one embodiment, the network includes a Radio Access Network (RAN) and/or a serving cell and/or a base station.

In one embodiment, the phrase of at least SRB includes at least one of {SRB0, SRB1, SRB2, SRB3}.

In one embodiment, the phrase of at least SRB includes both an SRB and a data radio bearer (DRB).

In one embodiment, the UE in the phrase of the UE and the network includes the first node.

In one embodiment, the other nodes include a relay node or other UE.

In one embodiment, when using a direct path for transmission, the UE can transmit a physical layer signaling to the network; when using an indirect path for transmission, the UE cannot transmit or directly transmit a physical layer signaling to the network.

In one embodiment, when using a direct path for transmission, the UE can transmit a MAC CE to the network; when using an indirect path for transmission, the UE cannot transmit or directly transmit a MAC CE to the network.

In one embodiment, when using a direct path for transmission, there isn't any other protocol layer between a PDCP layer and an RLC layer of the first node; when using an indirect path for transmission, there is at least one other protocol layer between a PDCP layer and an RLC layer of the first node.

In one subembodiment, the other protocol layer is or includes an adaption layer.

In one embodiment, when using a direct path for transmission, the network directly schedules uplink transmission of the first node via DCI; when using an indirect path for transmission, the network does not directly schedule uplink transmission of the first node via DCI.

In one embodiment, when using a direct path for transmission, an SRB of the first node is associated with an RLC entity and/or an RLC layer and/or an RLC bearer; when using an indirect path for transmission, an SRB of the first node is associated with an RLC entity of a PC5 interface.

In one embodiment, when using a direct path for transmission, a mapping relation exists between an SRB of the first node and an RLC entity of a Uu interface; when using an indirect path for transmission, a mapping relation exists between an SRB of the first node and an RLC entity of a PC5 interface.

In one embodiment, there only exists a direct path or an indirect path between the first node and the network.

In one embodiment, switching from a direct path to an indirect path means: starting to use an indirect path and stopping using a direct path.

In one embodiment, switching from a direct path to an indirect path means: starting to use an indirect path for transmission and stopping using a direct path for transmission.

In one embodiment, switching from a direct path to an indirect path means: turning a direct-path transmission into an indirect-path transmission.

In one embodiment, switching from a direct path to an indirect path means: the first node associates an SRB with an RLC entity of a PC5 interface and meanwhile releases an RLC entity of a Uu interface associated with the SRB.

In one embodiment, switching from a direct path to an indirect path means: the first node associates an SRB and a DRB with an RLC entity of a PC5 interface and meanwhile releases an RLC entity of a Uu interface associated with the SRB and the DRB.

In one embodiment, the relay in the present application is a U2N relay UE.

In one embodiment, the first node is in an RRC connected state.

In one embodiment, the relay in the present application is a L2 U2N relay UE.

In one embodiment, the first signaling is transmitted via an SRB other than SRB0.

In one embodiment, the first signaling uses an SRB1 or SRB3.

In one embodiment, the first message uses an SRB1 or SRB3.

In one embodiment, the first signaling is a downlink signaling

In one embodiment, the first message is an uplink message.

In one embodiment, a logical channel occupied by the first signaling is a DCCH.

In one embodiment, a logical channel occupied by the first message is a DCCH.

In one embodiment, the first signaling is transmitted in a unicast way.

In one embodiment, the first signaling is transmitted in a non-unicast way.

In one embodiment, the first message is transmitted in a unicast way.

In one embodiment, the first message is transmitted in a non-unicast way.

In one embodiment, the first signaling is RRCReconfiguration.

In one embodiment, the first signaling includes RRCReconfiguration.

In one embodiment, the first signaling is or includes ConditionalReconfiguration.

In one embodiment, the first signaling is or includes RRCReconfiguration comprised in ConditionalReconfiguration.

In one embodiment, the first signaling is or includes RRCReconfiguration comprised in CondReconfigToAddMod.

In one embodiment, the first signaling includes RRCConnectionReconfiguration.

In one embodiment, the first message is or includes a UEInformationResponse.

In one embodiment, the first message is or includes UEAssistanceInformation.

In one embodiment, the first message is or includes SidelinkUEInformation.

In one embodiment, the phrase that the first signaling is used to indicate a transition from a first radio link to a second radio link means that the first signaling indicates: starting to use the second radio link while stopping the use of the first radio link.

In one embodiment, the phrase that the first signaling is used to indicate a transition from a first radio link to a second radio link means that the first signaling indicates: starting to use the second radio link while releasing the first radio link.

In one embodiment, the phrase that the first signaling is used to indicate a transition from a first radio link to a second radio link means that the first signaling indicates: starting to use the second radio link while releasing the first radio link.

In one embodiment, the phrase that the first signaling is used to indicate a transition from a first radio link to a second radio link means that the first signaling indicates: switching from a direct path to an indirect path.

In one embodiment, the first radio link is or includes an RB.

In one embodiment, the second radio link is or includes an RB.

In one embodiment, the first radio link is or includes an RLC Bearer.

In one embodiment, the second radio link is or includes an RLC Bearer.

In one embodiment, the first radio link and the second radio link are respectively means of communication.

In one embodiment, the first radio link and the second radio link are respectively connections between the first node and the network.

In one embodiment, the first radio link and the second radio link are respectively communication links between the first node and the network.

In one embodiment, the first radio link and the second radio link are respectively channels between the first node and the network.

In one embodiment, the first radio link and the second radio link are respectively flows between the first node and the network.

In one subembodiment, the channel between the first node and the network is at least one of a physical channel, a transport channel or a logical channel.

In one embodiment, the transition from the first radio link to the second radio link indicated by the first signaling does not include DAPS handover.

In one embodiment, the transition from the first radio link to the second radio link indicated by the first signaling includes DAPS handover.

In one embodiment, the phrase that the first signaling is used to indicate a transition from a first radio link to a second radio link means that the first signaling indicates: a first RB of the first node is associated with a second RLC Bearer rather than a first RLC Bearer.

In one subembodiment, the first RB is or includes SRB.

In one subembodiment, the first RB is or includes DRB.

In one subembodiment, the first RB is or includes any RB.

In one subembodiment, the first RB is or includes any SRB other than SRB0.

In one subembodiment, the first RB is or includes any RB other than SRB0.

In one subembodiment, the first RLC Bearer is an RLC bearer of a Uu interface.

In one subembodiment, the first RLC Bearer is an RLC bearer.

In one subembodiment, the second RLC Bearer is an RLC bearer of a Uu interface.

In one subembodiment, the second RLC Bearer is a primary link RLC bearer.

In one subembodiment, the second RLC Bearer is an RLC bearer of a PC5 interface.

In one subembodiment, the second RLC Bearer is a sidelink RLC bearer.

In one subembodiment, when the second radio link is a direct path, the second RLC Bearer is an RLC bearer of a Uu interface or an RLC bearer.

In one subembodiment, when the second radio link is an indirect path, the second RLC Bearer is an RLC bearer of a PC5 interface or a sidelink RLC bearer.

In one subembodiment, the phrase that a first RB is associated with a second RLC Bearer means that the second RLC Bearer is added or modified for the purpose of serving the first RB.

In one subembodiment, the phrase that a first RB is associated with a second RLC Bearer means that the second RLC Bearer serves the first RB.

In one subembodiment, the phrase that a first RB is associated with a second RLC Bearer means that data of the first RB is transmitted by the second RLC Bearer.

In one subembodiment, the phrase that a first RB is associated with a first RLC Bearer means that an identity of the first RB is associated with an identity of the second RLC Bearer.

In one subembodiment, the phrase that a first RB is associated with a first RLC Bearer means that a relation of mapping exists between an identity of the first RB and an identity of the second RLC Bearer.

In one subembodiment, the phrase that a first RB is associated with a first RLC Bearer means that a relation of mapping exists between the first RB and the second RLC Bearer.

In one subembodiment, the phrase that a first RB is not associated with a first RLC Bearer means that an RB served by the first RLC Bearer does not include the first RB.

In one subembodiment, the phrase that a first RB is not associated with a first RLC Bearer means that data of the first RB is transmitted by an RLC Bearer other than the first RLC Bearer.

In one subembodiment, the phrase that a first RB is not associated with a first RLC Bearer means that an identity of the first RB is not associated with an identity of the first RLC Bearer.

In one subembodiment, the phrase that a first RB is not associated with a first RLC Bearer means that a relation of mapping exists between the first RB and the first RLC Bearer.

In one subembodiment, the phrase that a first RB is not associated with a first RLC Bearer means that the first RLC Bearer is released.

In one subembodiment, the phrase that a first RB is not associated with a first RLC Bearer means that the first RLC Bearer is suspended.

In one subembodiment, the phrase that a first RB is not associated with a first RLC Bearer means that the first RB is no longer associated with the first RLC Bearer.

In one embodiment, the phrase that the first signaling is used to indicate a transition from a first radio link to a second radio link means that the second radio link is used instead of using the first radio link.

In one subembodiment, the second radio link is a radio link via a first relay, the first relay being a relay of the first node.

In one subembodiment, the second radio link is a radio link via a first relay, the first relay being a L2 U2N relay of the first node.

In one subembodiment, the first relay is a suitable relay of the first node.

In one embodiment, the phrase that the first signaling is used to indicate a transition from a first radio link to a second radio link means not using the first radio link and establishing a connection to the first relay, where a radio link established that connects to the network via the first relay is the second radio link.

In one subembodiment, the first relay is a L2 U2N relay of the first node.

In one subembodiment, the first relay is a suitable relay of the first node.

In one embodiment, the second radio link is an indirect path already established.

In one embodiment, the second radio link is an indirect path yet to be established.

In one embodiment, the second radio link is a direct path already established.

In one embodiment, the second radio link is a direct path yet to be established.

In one embodiment, the first radio link and the second radio link are for a same cell.

In one embodiment, the first radio link and the second radio link are for a same cell group.

In one embodiment, the first radio link and the second radio link are for different cells.

In one embodiment, the first radio link and the second radio link are for different cell groups.

In one embodiment, the first radio link is a radio link from the first node to the network.

In one embodiment, the first radio link is a radio link from the first node via relay to the network.

In one embodiment, the first radio link includes a radio link from the first node to a relay and from the relay to the network.

In one embodiment, when the second radio link is a direct path, the first radio link and the second radio link are for different cells.

In one embodiment, when the second radio link is an indirect path, the first radio link and the second radio belong to a same cell.

In one embodiment, when the second radio link is a direct path, the second radio link does not include sidelink; when the second radio link is an indirect path, the second radio link includes sidelink.

In one embodiment, the phrase that the first signaling is used to indicate a transition from a first radio link to a second radio link means that the first signaling comprises reconfigurationWithSync field.

In one embodiment, the phrase that the first signaling is used to indicate a transition from a first radio link to a second radio link means starting to use data transmitted by a first parameter group to or coming from the network; and stopping using data transmitted by a second parameter group to or coming from the network.

In one subembodiment, the first signaling comprises reconfigurationWithSync field.

In one subembodiment, the first parameter group at least comprises physical-layer parameters; the second parameter group at least comprises physical-layer parameters.

In one subembodiment, the first parameter group at least comprises MAC layer parameters; the second parameter group at least comprises MAC layer parameters.

In one subembodiment, the first parameter group at least comprises RLC layer parameters; the second parameter group at least comprises RLC layer parameters.

In one embodiment, the phrase that the first signaling is used to indicate a transition from a first radio link to a second radio link means that when the second radio link is a direct path, the action of transiting from a first radio link to a second radio link involves random access; when the second radio link is an indirect path, the action of transiting from a first radio link to a second radio link involves no random access.

In one embodiment, the phrase that the first signaling is used to indicate a transition from a first radio link to a second radio link means that when the second radio link is a direct path, the first signaling indicates random access resources related to the second radio link; when the second radio link is an indirect path, the first signaling does not indicate random access resources.

In one embodiment, the first signaling indicates running time of the first timer.

In one embodiment, the first signaling indicates a length of the first timer.

In one embodiment, the first signaling indicates an expiration value of the first timer.

In one embodiment, the first signaling indicates conditions for application of the first timer.

In one embodiment, the first signaling indicates activation of the first timer.

In one embodiment, the RRC re-establishment is an RRC procedure, including at least transmitting an RRC message.

In one embodiment, the RRC re-establishment includes transmitting an RRC re-establishment request.

In one embodiment, the phrase of determining a radio link handover failure is or includes: determining that performing the first signaling is uncompleted.

In one subembodiment, the radio link HOF is failing to complete the first signaling.

In one embodiment, the phrase of determining a radio link handover failure is or includes: determining a failure resulting from expiration of the first timer.

In one subembodiment, the radio link HOF is or includes a failure of the first timer being expired.

In one embodiment, the phrase of determining a radio link handover failure is or includes: determining an occurrence of a radio link HOF.

In one subembodiment, the radio link HOF is or includes a path switch failure.

In one embodiment, the phrase of determining a radio link handover failure is or includes: determining that it is necessary to store information about the radio link HOF.

In one embodiment, the phrase of determining a radio link handover failure is or includes: determining that it is necessary to report information about the radio link HOF.

In one embodiment, the phrase of determining a radio link handover failure is or includes: determining an occurrence of a handover failure.

In one subembodiment, the radio link HOF is or includes a handover failure.

In one embodiment, the phrase of determining a radio link handover failure is or includes: determining an occurrence of a path switch failure.

In one subembodiment, the radio link HOF is or includes a path switch failure.

In one embodiment, the phrase of determining a radio link handover failure is or includes: determining an occurrence of failure of a type of hof.

In one subembodiment, the radio link HOF is or includes a failure of a type of hof.

In one embodiment, the phrase of determining a radio link handover failure is or includes: determining an occurrence of failure for a cause of hof.

In one subembodiment, the radio link HOF is or includes a failure for a cause of hof.

In one subembodiment, the radio link HOF is or includes a failure of a hof failure.

In one embodiment, the phrase of determining a radio link handover failure is or includes: determining an occurrence of failure for a cause of psf.

In one subembodiment, the radio link HOF is or includes a failure for a cause of psf.

In one subembodiment, the radio link HOF is or includes a failure of a psf failure.

In one embodiment, the phrase of determining a radio link handover failure is or includes: determining an occurrence of a reconfiguration with sync failure.

In one embodiment, the format of the first message is the content of the first message.

In one embodiment, the format of the first message is a set of Information Elements (IEs) contained in the first message.

In one embodiment, the format of the first message is a set of fields contained in the first message.

In one embodiment, the format of the first message is a set of RRC IEs contained in the first message.

In one embodiment, the first identity is or includes an identity of the first node.

In one embodiment, the first identity is or includes a C-RNTI of the first node.

In one embodiment, the first identity is or includes a C-RNTI of a node other than the first node.

In one embodiment, the first identity is or includes an identity of a transmitter of the first signaling.

In one embodiment, the first identity is a link layer ID.

In one embodiment, the first identity is or includes a Layer-2 ID.

In one embodiment, the first identity is or includes an identity of a relay comprised in the second radio link.

In one embodiment, the first identity is or includes an identity of a serving cell of a relay comprised in the second radio link.

In one embodiment, the first identity is or includes an identity used for an adaption layer.

In one embodiment, the first identity is or includes a CGI or PCI.

In one embodiment, the first identity is or includes an identity of the first relay, the first relay being a relay comprised in the second radio link, the second radio link being an indirect path.

In one embodiment, the first signaling comprises the first identity.

In one embodiment, the first signaling comprises an identity of a PC5 RLC Bearer.

In one embodiment, the first signaling comprises an identity of a sidelink RLC Bearer.

In one embodiment, the first identity is an identity of a target cell that the second radio link is targeted for.

In one embodiment, the first identity is a 5G-S-TMSI.

In one embodiment, the first identity is a I-RNTI.

In one embodiment, the first message is only transmitted after expiration of the first timer.

In one embodiment, after the expiration of the first timer and before the first message is transmitted, the first timer is not expired.

In one embodiment, after the expiration of the first timer and before the first message is transmitted, T304 is not expired.

In one embodiment, after the expiration of the first timer and before the first message is transmitted, the first timer is not yet started or restarted.

In one embodiment, after the expiration of the first timer and before the first message is transmitted, T304 is not yet started or restarted.

In one embodiment, the meaning of the phrase that the first message uses a first format is or includes: the first message is transmitted in the first format.

In one embodiment, the meaning of the phrase that the first message uses a first format is or includes: the content of the first message is what is contained in the first format.

In one embodiment, the meaning of the phrase that the first message uses a first format is or includes: a field in the first message is a field comprised in the first format.

In one embodiment, the meaning of the phrase that the first message uses a first format is or includes: an IE in the first message is an IE comprised in the first format.

In one embodiment, the meaning of the phrase that the first message uses a first format is or includes: an RRC IE in the first message is an RRC IE comprised in the first format.

In one embodiment, the meaning of the phrase that the first message uses a first format is or includes: the first message comprises all contents and/or all fields in the first format.

In one embodiment, the meaning of the phrase that the first message uses a first format is or includes: the first message comprises determined contents and/or determined fields in the first format.

In one embodiment, the meaning of the phrase that the first message uses a second format is or includes: the first message is transmitted in the second format.

In one embodiment, the meaning of the phrase that the first message uses a second format is or includes: the content of the first message is what is contained in the second format.

In one embodiment, the meaning of the phrase that the first message uses a second format is or includes: a field in the first message is a field comprised in the second format.

In one embodiment, the meaning of the phrase that the first message uses a second format is or includes: an IE in the first message is an IE comprised in the second format.

In one embodiment, the meaning of the phrase that the first message uses a second format is or includes: an RRC IE in the first message is an RRC IE comprised in the second format.

In one embodiment, the meaning of the phrase that the first message uses a second format is or includes: the first message comprises all contents and/or all fields in the second format.

In one embodiment, the meaning of the phrase that the first message uses a second format is or includes: the first message comprises determined contents and/or determined fields in the second format.

In one embodiment, whether the first message uses the first format or the second format, the first message indicates the radio link handover failure.

In one embodiment, when the first message uses the first format, what is contained in the radio link handover failure indicated by the first message is different from that contained in the radio link handover failure indicated by the first message using the second format.

In one embodiment, when the first message uses the second format, what is contained in the radio link handover failure indicated by the first message comprises a second field; when the first message uses the first format, what is contained in the radio link handover failure indicated by the first message does not comprise a second field.

In one embodiment, when the first message uses the second format, what is contained in the radio link handover failure indicated by the first message comprises a third field; when the first message uses the first format, what is contained in the radio link handover failure indicated by the first message also comprises a second field; but when the first message uses the second format, the third field comprised in what is contained in the radio link handover failure indicated by the first message is different in value from that comprised in what is contained in the radio link handover failure indicated by the first message when using the first format.

In one embodiment, the first message comprises first failure information, the first failure information indicating the radio link handover failure.

In one subembodiment, the first failure information is a rlf-Report.

In one subembodiment, the first failure information is a sl-FailureList.

In one subembodiment, the first failure information is a sl-FailureReport.

In one subembodiment, the first failure information is a sl-RelayFailureList.

In one subembodiment, the name of the first failure information includes failure.

In one subembodiment, the name of the first failure information includes fail.

In one subembodiment, the name of the first failure information includes relay.

In one embodiment, the first timer includes T304.
In one embodiment, the first timer is T303.
In one embodiment, the first timer is T305.
In one embodiment, the first timer is T314.
In one embodiment, the first timer is T324.
In one embodiment, the first timer is T334.
In one embodiment, the first timer is T344.
In one embodiment, the first timer is T304a.
In one embodiment, the first timer is T304b.
In one embodiment, the first timer is T304r.
In one embodiment, the first timer is T304-r.
In one embodiment, the first timer is T401.
In one embodiment, the first timer is T402.
In one embodiment, the first timer is T403.
In one embodiment, the first timer is T404.
In one embodiment, the first timer is T414.
In one embodiment, the first timer is T411.
In one embodiment, the first timer is T410.
In one embodiment, the first timer is T500.
In one embodiment, the first timer is T501.
In one embodiment, the first timer is T502.
In one embodiment, the first timer is T503.
In one embodiment, the first timer is T504.
In one embodiment, the first timer is T514.
In one embodiment, a name of the first timer includes relay.
In one embodiment, a name of the first timer includes r.
In one embodiment, a name of the first timer includes T1.
In one embodiment, a name of the first timer includes T2.
In one embodiment, a name of the first timer includes 304.
In one embodiment, a name of the first timer is T3x4, where x is one of 1, 2, 3, 4, 5, 6, 7, 8 or 9.
In one embodiment, the first timer is not T304.

In one embodiment, the first timer being expired triggers the first node's performance of the RRC Re-establishment.

In one embodiment, the first format and the second format are RRC IEs with different names.

In one embodiment, the first format and the second format are at least different in one field.

In one embodiment, the second format is used to indicate that the failure of performing the first signaling is related to relay.

In one embodiment, the second format of the first message explicitly indicates that the failure of performing the first signaling is related to relay.

In one embodiment, a time gap between the radio link handover failure and transmitting the first message is smaller than 48 hours.

In one embodiment, neither a handover failure (HOF) nor a radio link failure (RLF) occurs between the radio link handover failure and transmitting the first message.

In one embodiment, a first feedback message is transmitted, the first feedback message being used to acknowledge that the first signaling is completed.

In one subembodiment, the first feedback message is RRCReconfigurationComplete.

In one embodiment, reception of the first signaling triggers a start of the first timer.

In one embodiment, performance of the first signaling triggers a start of the first timer.

In one embodiment, transmission of the first feedback message triggers a start of the first timer.

In one embodiment, along with reception of the first signaling, the first node starts the first timer.

In one embodiment, along with performance of the first signaling, the first node starts the first timer.

In one embodiment, along with transmission of the first message, the first node starts the first timer.

In one embodiment, along with transmission of the first feedback message, the first node starts the first timer.

In one embodiment, along with the establishment of a sidelink comprised in the second radio link, the first node starts the first timer.

In one embodiment, the first format of the first message does not indicate that the radio link handover failure is related to relay.

In one embodiment, the second format of the first message indicates that the radio link handover failure is related to relay by indicating the second radio link, the second radio link being an indirect path.

In one embodiment, the second format of the first message indicates that the radio link handover failure is related to relay by indicating that the second radio link is an indirect path.

In one embodiment, the first node, in response to the expiration of the first timer, stores first failure information in a first variable; the first variable is used for generating the first message; the first failure information is information about the radio link handover failure (HOF).

In one subembodiment, the first failure information is stored in a rlf-Report field of the first variable.

In one subembodiment, the first failure information indicates the radio link handover failure.

In one subembodiment, whether the first message uses the first format or the second format, the first failure information is generated by the first variable.

In one subembodiment, the first variable is a VarRLF-Report.

In one subembodiment, the first message is a UEInformationResponse message.

In one subembodiment, the first failure information comprises and only comprises failure information related to an access stratum (AS).

In one subembodiment, the first message comprises a first sub-message and a second sub-message; the first sub-message and the second sub-message respectively comprise at least partial information of failure of performing a first signaling; the first sub-message is UEInformationResponse, and the second sub-message is SidelinkUEInformation.

In one subembodiment, the first failure information is a rlf-Report.

In one subembodiment, the first failure information comprises an identity of the first node.

In one subembodiment, the first failure information comprises an identity of a serving cell of the first node.

In one subembodiment, the first failure information comprises an identity of a cell transmitting the first signaling.

In one subembodiment, the first failure information comprises a measurement result of a cell transmitting the first signaling In one subembodiment, the first failure information comprises an effective measurement result.

In one subembodiment, the first failure information comprises an identity of a target cell.

In one subembodiment, the first failure information comprises a plmn-IdentityList.

In one subembodiment, the first failure information comprises a measResultLastServCell.

In one subembodiment, the first failure information comprises rsIndexResults.

In one subembodiment, the first failure information comprises a ssbRLMConfigBitmap.

In one subembodiment, the first failure information comprises a measObjectNR.

In one subembodiment, the first failure information comprises a measResultListNR.

In one subembodiment, the first failure information comprises a connectionFailureType.

In one subembodiment, the first failure information comprises a rlf-Cause.

In one subembodiment, the first failure information comprises locationInfo.

In one subembodiment, the first failure information comprises an identity of a relay comprised in the second radio link.

In one subembodiment, the first failure information comprises a measurement result of a relay comprised in the second radio link.

In one subembodiment, the first failure information comprises a type of a relay comprised in the second radio link.

In one subembodiment, the first failure information comprises whether a type of a relay comprised in the second radio link is a L2 relay or a L3 relay.

In one subembodiment, the first failure information comprises a serving cell of a relay comprised in the second radio link.

In one subembodiment, the first failure information comprises a primary cell (PCell) of a relay comprised in the second radio link.

In one subembodiment, the first failure information comprises an RRC state of a relay comprised in the second radio link.

In one subembodiment, the first failure information comprises a PLMN list of a relay comprised in the second radio link.

In one embodiment, the first node, in response to the expiration of the first timer, stores first failure information in a first variable; the first variable is used for generating the first message; the first failure information is information about the radio link handover failure (HOF); the first failure information uses the first format.

In one subembodiment, the first failure information is stored in a rlf-Report field of the first variable.

In one embodiment, the first timer being expired does not trigger the first node's storing information about the radio link HOF in a state variable; the first failure information uses the second format.

In one embodiment, the second radio link is an indirect path; the second format of the first message comprises first failure information, the first failure information comprising at least one of {a first failure cause, an identity of a first relay, a measurement result of a first relay, a state of a first relay, an indication of whether a PC5 connection is established to a first relay, an indication of whether an RRC connection is established to a first relay, a state of a second timer, a measurement result of a serving cell of a first relay, a cause for expiration of the first timer, whether a sidelink communication failure related to a first relay occurs};

where the first failure cause is a cause other than RLF or HOF; the first relay is a relay comprised in the second radio link indicated by the first signaling.

In one subembodiment, the first relay is a L2 U2N relay UE.

In one subembodiment, the first format of the first message does not comprises any one of {a failure cause other than RLF or HOF, an identity of a first relay, a measurement result of a first relay, a state of a first relay, an indication of whether a PC5 connection is established to a first relay, an indication of whether an RRC connection is established to a first relay, a state of a second timer, a measurement result of a serving cell of a first relay, a cause for expiration of the first timer, whether a sidelink communication failure related to a first relay occurs}.

In one subembodiment, a connectionFailureType field in the first message indicates the first failure cause, the first failure cause being a cause of failure other than HOF or RLF.

In one subembodiment, an identity of the first relay is or includes a Layer-2 ID of the first relay.

In one subembodiment, an identity of the first relay is or includes a Layer-2 ID in a discovery message sent by the first relay.

In one subembodiment, an identity of the first relay is or includes a C-RNTI of the first relay.

In one subembodiment, an identity of the first relay is or includes a temporary ID of the first relay used for adaption layer.

In one subembodiment, the measurement result of the first relay comprises an SL-RSRP and/or SD-RSRP.

In one subembodiment, the measurement result of the first relay is configured by measObjectNR.

In one subembodiment, a state of the first relay includes an RRC state of the first relay.

In one subembodiment, a state of the first relay includes a cell-selection retransmitted state of the first relay.

In one subembodiment, a state of the first relay includes a camped normally state.

In one subembodiment, an indication of whether a PC5 connection is established to the first relay includes an indication of establishing a direct link for relay to the first relay.

In one subembodiment, an indication of whether a PC5 connection is established to the first relay includes an indication of establishing a sidelink to the first relay.

In one subembodiment, an indication of whether an RRC connection is established to the first relay includes an indication of whether a PC5-RRC connection is established to the first relay.

In one subembodiment, an indication of whether an RRC connection is established to the first relay includes whether a RRCReconfigurationCompleteSidelink from the first relay is received.

In one subembodiment, the second timer includes T400.

In one subembodiment, the second timer includes a timer started along with the establishment of a direct link.

In one subembodiment, the second timer includes a timer started along with the establishment of a PC5 link or PC5 interface.

In one subembodiment, the second timer includes a timer started along with the establishment of a sidelink.

In one subembodiment, a measurement result of a serving cell of the first relay includes a result of measurement for a serving cell of the first relay.

In one subembodiment, a measurement result of a serving cell of the first relay includes a result of measurement for a primary cell (PCell) of the first relay.

In one subembodiment, causes for the expiration of the first timer include one of {NAS-related cause, AS-related cause, timer expiration, PC5 establishment failed, PC5 release, PC5 rejection, RLF, relay unavailable, cell re-selection performed by relay, handover performed by relay, sidelink establishment failed, failure on Uu interface of first relay, compatibility failure, authentication failure, security setup failure, cell being barred, PLMN unavailable}.

In one subembodiment, the element of whether a sidelink communication failure related to a first relay occurs includes: whether a sidelink communication failure for relay that is related to the first relay occurs.

In one subembodiment, the element of whether a sidelink communication failure related to a first relay occurs includes: whether a sidelink radio link failure related to the first relay occurs.

In one subembodiment, the element of whether a sidelink communication failure related to a first relay occurs includes: whether a sidelink integrity verification failure related to the first relay occurs.

In one subembodiment, the element of whether a sidelink communication failure related to a first relay occurs includes: whether a sidelink occurring configuration related to the first relay occurs.

In one embodiment, the second format of the first message does not comprise a nrFailedPCellId field, and the second format of the first message not comprising the nrFailedPCellId field is used for indicating that the radio link HOF is related to relay.

In one subembodiment, the first format of the first message comprises a nrFailedPCellId field.

In one subembodiment, the second format of the first message implicitly indicates that the radio link HOF is related to relay.

In one subembodiment, if the second format of the first message does not comprise a nrFailedPCellId field, it is clear that the radio link HOF is related to relay.

In one subembodiment, a cell for which the first radio link is targeted and a cell for which the second radio link is targeted are a same cell.

In one embodiment, the second radio link is an indirect path; the second format of the first message comprises a nrFailedPCellId field, and the nrFailedPCellId field comprised in the second format of the first message indicates an identity of a first relay, the first relay being a relay comprised in the second radio link indicated by the first signaling.

In one subembodiment, an identity of the first relay is or includes a Layer-2 ID.

In one subembodiment, an identity of the first relay is or includes a Layer-2 ID in a discovery message sent by the first relay.

In one subembodiment, an identity of the first relay is or includes a C-RNTI of the first relay.

In one subembodiment, an identity of the first relay is or includes a temporary ID of the first relay used for adaption layer.

In one subembodiment, the first relay is a L2 relay.

In one subembodiment, the first relay is a L2 U2N relay UE.

In one embodiment, when the second radio link is an indirect path, the second radio link includes a first relay.

In one embodiment, the first relay is a L2 U2N relay.

In one embodiment, the first relay is a U2N relay UE.

In one embodiment, the first relay is a UE.

In one embodiment, the first relay is a L2 U2N relay UE.

In one embodiment, the first relay is a L2 relay.

In one embodiment, the first relay is a suitable relay.

In one embodiment, the suitable L2 relay is or includes: a relay that receives system information from the suitable L2 relay.

In one embodiment, the suitable L2 relay is or includes: a relay that receives essential system information from the suitable L2 relay.

In one embodiment, the suitable L2 relay is or includes: a relay to which the first node indicates information about receiving paging.

In one embodiment, the suitable L2 relay is or includes: a relay to which the first node indicates information about receiving paging and by which the information is acknowledged.

In one embodiment, the suitable L2 relay is or includes: a relay with the capability of monitoring a paging message from the first node.

In one embodiment, the suitable L2 relay is or includes: a relay capable of monitoring a paging message from the first node.

In one embodiment, the suitable L2 relay is or includes: a relay capable of forwarding notification from the network.

In one embodiment, the suitable L2 relay is or includes: a relay in which no RLF occurs.

In one embodiment, the suitable L2 relay is or includes: a L2 U2N relay by which the SL-RSRP and/or SD-RSRP measured meets certain requirement.

In one subembodiment, the first node performs a measurement on a candidate relay to obtain the SL-RSRP and/or SD-RSRP.

In one subembodiment, a candidate relay performs a measurement on the first node to obtain the SL-RSRP and/or SD-RSRP.

In one embodiment, the suitable L2 relay is or includes: a L2 U2N relay by which the SL-RSRQ and/or SD-RSRQ measured meets certain requirement.

In one subembodiment, the first node performs a measurement on a candidate relay to obtain the SL-RSRQ and/or SD-RSRQ.

In one subembodiment, a candidate relay performs a measurement on the first node to obtain the SL-RSRQ and/or SD-RSRQ.

In one embodiment, the suitable L2 relay is or includes: a relay that does not receive an indication of releasing or rejecting a direct link.

In one embodiment, the suitable L2 relay is or includes: a relay to which a direct link is alive.

In one embodiment, the suitable L2 relay is or includes: a relay in a normal camping state or a relay in an RRC connected state.

In one embodiment, the phrase that an RRC connection is established includes establishing an RRC connection.

In one embodiment, the phrase that an RRC connection is established includes resuming an RRC connection.

In one embodiment, the phrase that an RRC connection is established includes re-establishing an RRC connection.

In one embodiment, when the RRC connection is established, the first node enters an RRC connected state.

In one embodiment, when the RRC connection is established, the first node is RRC connected with an access network.

Embodiment 2

Figure 2:
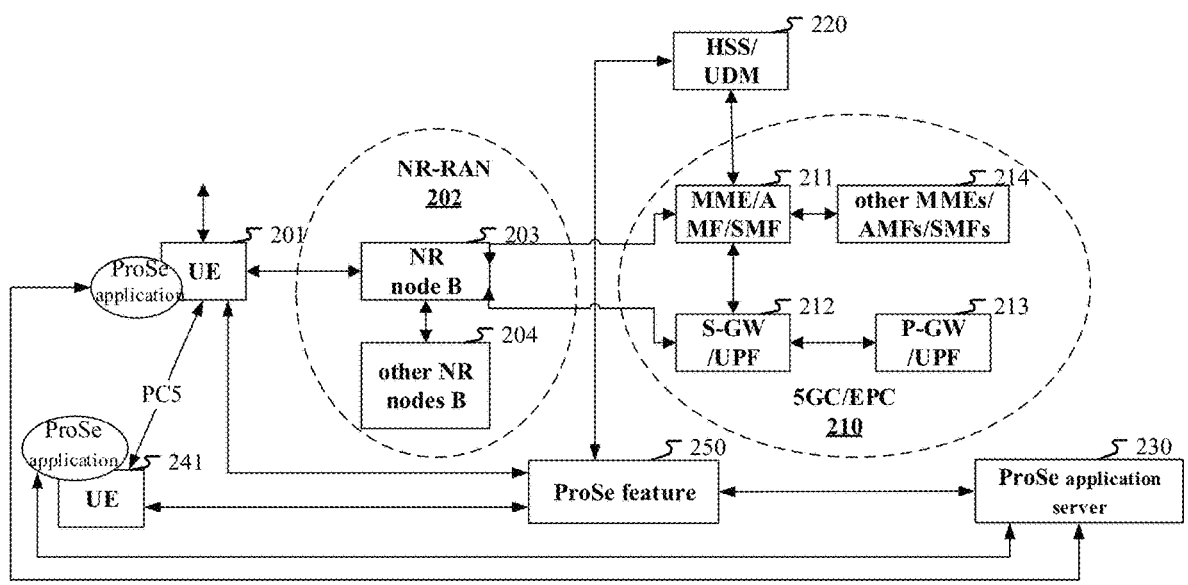
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 is a diagram illustrating a V2X communication architecture of 5G NR, Long-Term Evolution (LTE), and Long-Term Evolution Advanced (LIE-A) systems. The 5G NR or LTE network architecture may be called a 5G System/Evolved Packet System (5GS/EPS) 200 or other appropriate terms.

The V2X communication architecture in Embodiment 2 may comprise a UE 201, a UE241, an NG-RAN 202, a 5G-Core Network/Evolved Packet Core (5GC/EPC) 210, a Home Subscriber Server/ Unified Data Management(HSS/UDM) 220, a ProSe feature250 and ProSe application server 230. The V2X communication architecture may be interconnected with other access networks. For simple description, the entities/interfaces are not shown. As shown in FIG. 2, theV2X communication architecture provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services. The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the UE201 and the UE241 are connected by a PC5 Reference Point.

In one embodiment, the ProSe feature 250 is connected to the UE 201 and the UE 241 respectively by PC3 Reference Points.

In one embodiment, the ProSe feature 250 is connected to the ProSe application server 230 by a PC2 Reference Point.

In one embodiment, the ProSe application server 230 is connected with the ProSe application of the UE 201 and the ProSe application of the UE 241 respectively via a PC1 Reference Point.

In one embodiment, the first node in the present application is the UE 201.

In one embodiment, the second node in the present application is the gNB203, i.e., an NR Node B.

In one embodiment, the third node in the present application is the UE 241.

In one embodiment, the fourth node in the present application is other NR Node B204, or a node in the core network 210.

In one embodiment, a radio link between the UE 201 and the UE 241 corresponds to a sidelink (SL) in the present application.

In one embodiment, a radio link from the UE 201 to the NR Node B is an uplink.

In one embodiment, a radio link from the NR Node B to the UE 201 is a downlink In one embodiment, a radio link from the UE 241 to the NR Node B is an uplink.

In one embodiment, a radio link from the NR Node B to the UE 241 is a downlink In one embodiment, the UE 201 supports relay transmission.

In one embodiment, the UE 241 supports relay transmission.

In one embodiment, the UE 201 includes cellphone.

In one embodiment, the UE 241 includes cellphone.

In one embodiment, the UE 201 is a means of transportation including automobile.

In one embodiment, the UE 241 is a means of transportation including automobile.

In one embodiment, the gNB 203 is a MacroCellular base station.

In one embodiment, the gNB203 is a Micro Cell base station.

In one embodiment, the gNB 203 is a PicoCell base station.

In one embodiment, the gNB203 is a flight platform.

In one embodiment, the gNB203 is satellite equipment.

Embodiment 3

Figure 3:
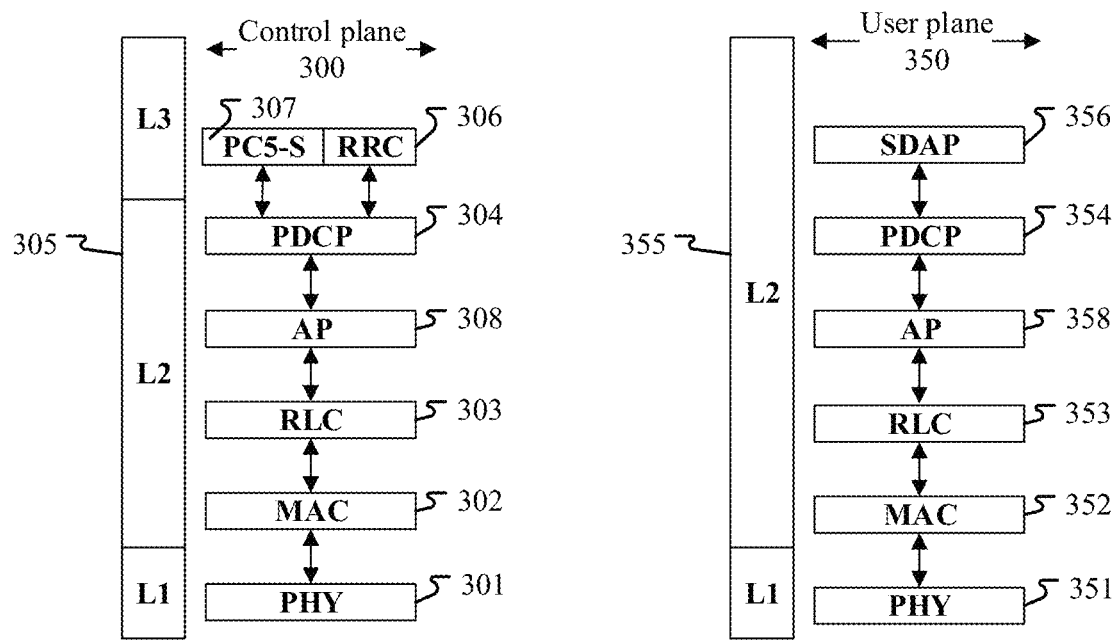
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, gNB, or, satellite or aircraft in NTN) and a second node (gNB, UE, or satellite or aircraft in NTN), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between a first node and a second node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The PC5 Signaling Protocol (PC5-S) sublayer307 is responsible for processing the signaling protocol at the PC5 interface. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355. Besides, the first node comprises a network layer (i.e., IP layer) terminated at a P-GW 213 of the network side and an application layer terminated at the other side of the connection (i.e., a peer UE, a server, etc.). For a UE involved with relay services, its control plane can also comprise an adaption sublayer AP308, and its user plane can also comprise an adaption sublayer AP358. The introduction of the adaption layer is beneficial for lower layers such as the MAC or the RLC layer to multiple and/or distinguish data from multiple source UEs. For UE-UE communications relating to relay services, the adaption sublayer can be excluded. Besides, adaption sublayers AP308 and AP358 can respectively serve as sublayers of the PDCP304 and PDCP354. The RRC306 can be used for processing an RRC signaling of the Uu interface and a signaling of the PC5 interface.

In one embodiment, the radio protocol architecture in FIG. 3 is applicable to the first node in the present application.

In one embodiment, the radio protocol architecture in FIG. 3 is applicable to the second node in the present application.

In one embodiment, the radio protocol architecture in FIG. 3 is applicable to the third node in the present application.

In one embodiment, the first signaling in the present application is generated by the RRC 306.

In one embodiment, the first message in the present application is generated by the RRC306.

In one embodiment, the first feedback message in the present application is generated by the RRC306.

Embodiment 4

Figure 4:
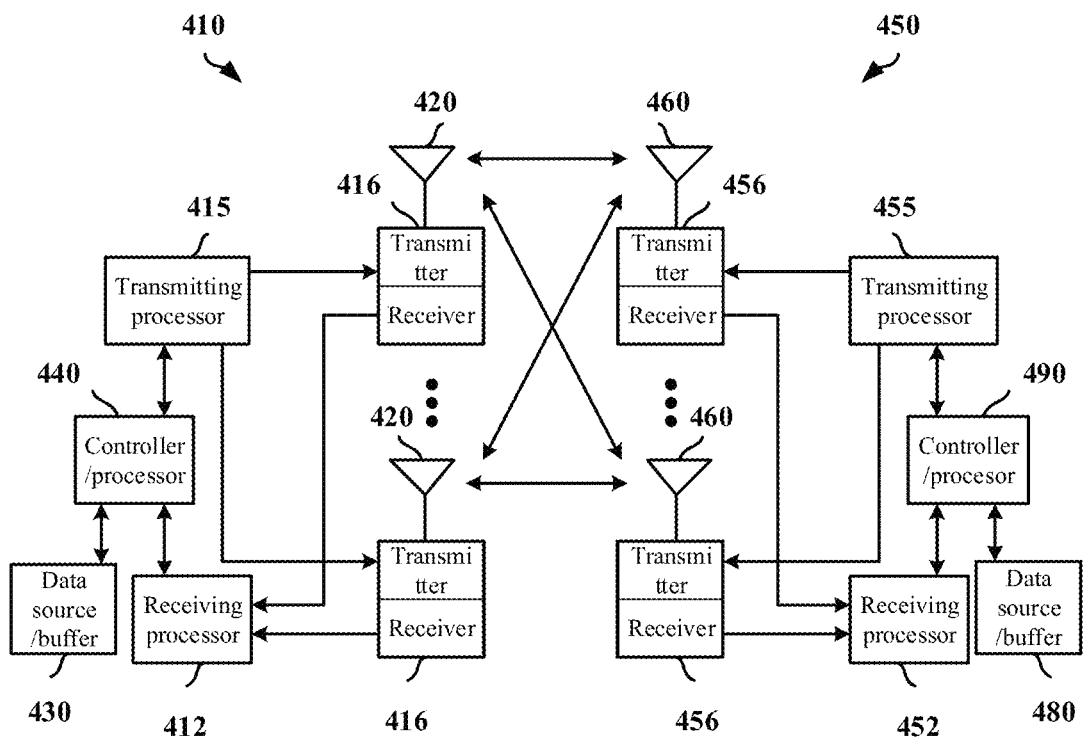
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer (Layer-2). In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any spatial stream targeting the first communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: receives a first signaling, the first signaling being used to indicate a transition from a first radio link to a second radio link; the first radio link is a direct path; the first signaling is used for configuring a first timer; in response to expiration of the first timer, determines a radio link handover failure and initiating an RRC re-establishment; and transmits a first message; herein, a format of the first message and the first timer are respectively related to whether the second radio link is a direct path or an indirect path; the first signaling is an RRC message using an SRB; the first message is an RRC message using an SRB; the first message comprises at least a first identity; transmitting the first message is later than the expiration of the first timer; when the second radio link is a direct path, the first message uses a first format, when the second radio link is an indirect path, the first message uses a second format; the first format and the second format are respectively used to indicate the radio link handover failure (HOF); the indirect path is in communication with the network via relay; the direct path is in communication with the network without relay; when the second radio link is a direct path, the first timer is T304, when the second radio link is an indirect path, the first timer is a timer other than T304.

In one embodiment, the first communication node 450 comprises a memory that stores a computer readable instruction program, the computer readable instruction program generates actions when executed by at least one processor, which include: receiving a first signaling, the first signaling being used to indicate a transition from a first radio link to a second radio link; the first radio link is a direct path; the first signaling is used for configuring a first timer; in response to expiration of the first timer, determining a radio link handover failure and initiating an RRC re-establishment; and transmitting a first message; herein, a format of the first message and the first timer are respectively related to whether the second radio link is a direct path or an indirect path; the first signaling is an RRC message using an SRB; the first message is an RRC message using an SRB; the first message comprises at least a first identity; transmitting the first message is later than the expiration of the first timer; when the second radio link is a direct path, the first message uses a first format, when the second radio link is an indirect path, the first message uses a second format; the first format and the second format are respectively used to indicate the radio link handover failure (HOF); the indirect path is in communication with the network via relay; the direct path is in communication with the network without relay; when the second radio link is a direct path, the first timer is T304, when the second radio link is an indirect path, the first timer is a timer other than T304.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: transmits a first signaling, the first signaling being used to indicate a transition from a first radio link to a second radio link; the first radio link is a direct path; the first signaling is used for configuring a first timer; a receiver of the first signaling, in response to expiration of the first timer, determines a radio link handover failure and initiates an RRC re-establishment; and receives a first message; herein, a format of the first message and the first timer are respectively related to whether the second radio link is a direct path or an indirect path; the first signaling is an RRC message using an SRB; the first message is an RRC message using an SRB; the first message comprises at least a first identity; transmitting the first message is later than the expiration of the first timer; when the second radio link is a direct path, the first message uses a first format, when the second radio link is an indirect path, the first message uses a second format; the first format and the second format are respectively used to indicate the radio link handover failure (HOF); the indirect path is in communication with the network via relay; the direct path is in communication with the network without relay; when the second radio link is a direct path, the first timer is T304, when the second radio link is an indirect path, the first timer is a timer other than T304.

In one embodiment, the second communication device 410 comprises a memory that stores a computer readable instruction program, the computer readable instruction program generates actions when executed by at least one processor, which include: transmitting a first signaling, the first signaling being used to indicate a transition from a first radio link to a second radio link; the first radio link is a direct path; the first signaling is used for configuring a first timer; a receiver of the first signaling, in response to expiration of the first timer, determining a radio link handover failure and initiating an RRC re-establishment; and receiving a first message; herein, a format of the first message and the first timer are respectively related to whether the second radio link is a direct path or an indirect path; the first signaling is an RRC message using an SRB; the first message is an RRC message using an SRB; the first message comprises at least a first identity; transmitting the first message is later than the expiration of the first timer; when the second radio link is a direct path, the first message uses a first format, when the second radio link is an indirect path, the first message uses a second format; the first format and the second format are respectively used to indicate the radio link handover failure (HOF); the indirect path is in communication with the network via relay; the direct path is in communication with the network without relay; when the second radio link is a direct path, the first timer is T304, when the second radio link is an indirect path, the first timer is a timer other than T304.

In one embodiment, the first communication device 450 corresponds to the first node in the present application.

In one embodiment, the second communication device 410 corresponds to the second node in the present application.

In one embodiment, the first communication device 450 corresponds to the third node in the present application.

In one embodiment, the first communication device 450 is a UE.

In one embodiment, the first communication device 450 is a vehicle-mounted terminal.

In one embodiment, the first communication device 450 is a cellphone.

In one embodiment, the first communication device 450 is a relay.

In one embodiment, the second communication device 410 is a base station.

In one embodiment, the receiver 456 (comprising the antenna 460), the receiving processor 452 and the controller/processor 490 are used for receiving the first signaling in the present application.

In one embodiment, the transmitter 456 (comprising the antenna 460), the transmitting processor 455 and the controller/processor 490 are used for transmitting the first message in the present application.

In one embodiment, the transmitter 416 (comprising the antenna 420), the transmitting processor 412 and the controller/processor 440 are used for transmitting the first feedback message in the present application.

Embodiment 5

Figure 5:
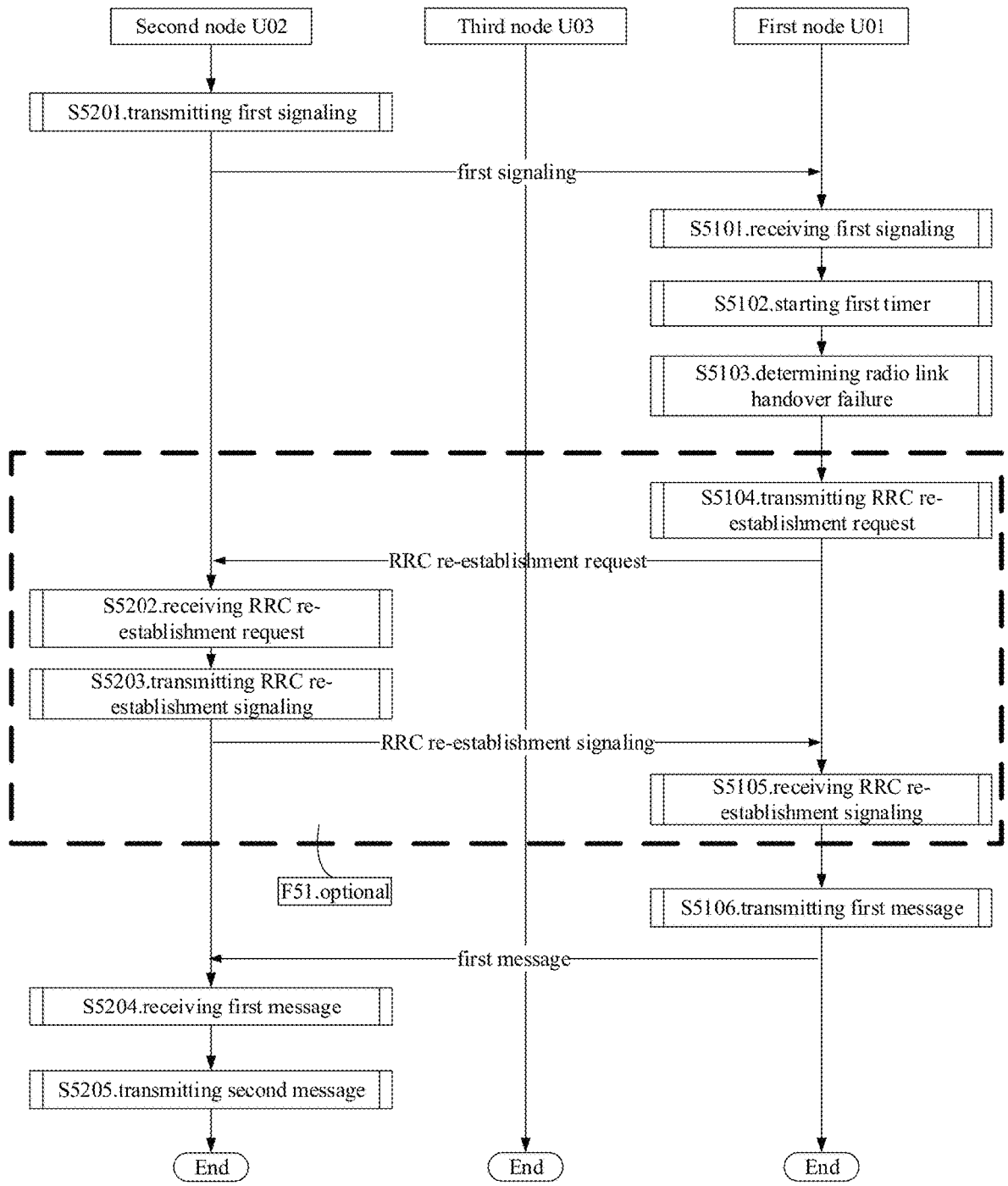
FIG. 5 illustrates a flowchart of radio signal transmission according to one embodiment of the present application.

Embodiment 5 illustrates a flowchart of radio signal transmission according to one embodiment of the present application, as shown in FIG. 5. In FIG. 5, U01 corresponds to a first node in the present application while U02 corresponds to a second node in the present application, and a third node U03 is a relay node; in Embodiment 5, the third node U03 only involves scenarios in which the second radio link is an indirect path; it should be particularly noted that the sequential order presented herein does not restrict the orders of signal transmission and implementations in this present application, where steps given in F51 are optional, and the step S5205 is optional, too.

The first node U01 receives a first signaling in step S5101; starts a first timer in step S5102; determines a radio link handover failure in step S5103; transmits an RRC re-establishment request in step S5104; and receives an RRC re-establishment signaling in step S5105; and transmits a first message in step S5106.

The second node U02 transmits a first signaling in step S5201; receives an RRC re-establishment request in step S5202; and transmits an RRC re-establishment signaling in step S5203; receives a first message in step S5204; and transmits a second message in step S5205.

In Embodiment 5, the first signaling is used to indicate a transition from a first radio link to a second radio link; the first radio link is a direct path; the first signaling is used for configuring a first timer; a format of the first message and the first timer are respectively related to whether the second radio link is a direct path or an indirect path; the first signaling is an RRC message using an SRB; the first message is an RRC message using an SRB; the first message comprises at least a first identity; transmitting the first message is later than the expiration of the first timer; when the second radio link is a direct path, the first message uses a first format, when the second radio link is an indirect path, the first message uses a second format; the first format and the second format are respectively used to indicate the radio link handover failure (HOF); the indirect path is in communication with the network via relay; the direct path is in communication with the network without relay; when the second radio link is a direct path, the first timer is T304, when the second radio link is an indirect path, the first timer is a timer other than T304.

In one embodiment, the first node U01 is a U2N relay UE.

In one embodiment, the first node U01 is a U2N remote UE.

In one embodiment, the first node U01 is an NR ProSe U2N remote UE.

In one embodiment, the third node U03 is a UE.

In one embodiment, the third node U03 is a L2 U2N relay UE.

In one embodiment, the third node U03 is a U2N relay of the first node U01.

In one embodiment, the third node U03 is a L2 relay of the first node U01.

In one embodiment, the third node U03 is an NR ProSe U2N relay.

In one embodiment, the third node U03 is a U2N relay UE.

In one embodiment, the third node U03 provides L2 U2N relay service to the first node U01.

In one embodiment, the second node U02 is a base station.

In one embodiment, the second node U02 is a primary cell (PCell) of the first node U01.

In one embodiment, the second node U02 is a Master Cell Group (MCG) of the first node U01.

In one embodiment, the second node U02 is a primary cell (PCell) of the third node U03.

In one embodiment, the second node U02 is a serving cell of the third node U03.

In one embodiment, the second node U02 isn't a primary cell (PCell) of the third node U03.

In one embodiment, the second node U02 isn't a serving cell of the third node U03.

In one embodiment, the third node U03 is in an RRC connected state.

In one embodiment, the third node U03 is not in an RRC connected state.

In one embodiment, the third node U03 is the first relay.

In one embodiment, when the second radio link indicated by the first signaling is an indirect path, the first signaling comprises an identity of the third node U03.

In one embodiment, when the second radio link indicated by the first signaling is an indirect path, the first signaling comprises two identities of the third node U03, of which one identity is a Layer-2 ID.

In one embodiment, when the second radio link indicated by the first signaling is an indirect path, the first signaling comprises at least one field related to path switch.

In one subembodiment, when the second radio link indicated by the first signaling is a direct path, the first signaling comprises no field related to path switch.

In one embodiment, when the first signaling explicitly indicates that the second radio link is an indirect path, the second radio link is an indirect path; when the first signaling does not explicitly indicate that the second radio link is an indirect path, the second radio link is a direct path.

In one subembodiment, the phrase of explicitly indicating that the second radio link is an indirect path includes: the first signaling comprises at least one field that is related to path switch or the first signaling comprises at least one field whose name includes path switch.

In one subembodiment, the phrase of explicitly indicating that the second radio link is an indirect path includes: an IE comprised in the first signaling used for configuring the second radio link includes a relay.

In one subembodiment, the phrase of explicitly indicating that the second radio link is an indirect path includes: the name of an IE comprised in the first signaling used for configuring the second radio link includes relay.

In one subembodiment, the phrase of explicitly indicating that the second radio link is an indirect path includes: the name of an IE comprised in the first signaling used for configuring the second radio link includes relay ID.

In one subembodiment, the phrase of explicitly indicating that the second radio link is an indirect path includes: the first signaling comprises at least one field indicating that the second radio link comprises an RLC Bearer of a PC5 interface, and the RLC Bearer of the PC5 interface comprised serves at least one RB.

In one subembodiment, the phrase of explicitly indicating that the second radio link is an indirect path includes: the first signaling comprises at least one field indicating that the second radio link comprises a sidelink RLC Bearer, and the sidelink RLC Bearer comprised serves at least one RB.

In one embodiment, the first signaling uses a direct path for transmission.

In one embodiment, the first signaling uses the first radio link for transmission.

In one embodiment, the first node U01, in response to performing the first signaling, transmits a first feedback message, the first feedback message indicating completion of the first signaling In one subembodiment, the first feedback message is RRCReconfigurationComplete.

In one subembodiment, when the second radio link is a direct path, the first feedback message is transmitted through the direct path.

In one subembodiment, when the second radio link is an indirect path, the first feedback message is transmitted through the indirect path.

In one subembodiment, the first feedback message is transmitted through the second radio link.

In one embodiment, reception of the first signaling triggers the first node U01's starting of the first timer.

In one embodiment, performance of the first signaling triggers the first node U01's starting of the first timer.

In one embodiment, along with reception of the first signaling, the first node U01 starts the first timer.

In one embodiment, along with performance of the first signaling, the first node U01 starts the first timer.

In one embodiment, the first timer is started upon reception of the first signaling In one embodiment, the first timer is started upon performance of the first signaling.

In one embodiment, the first timer is already started before the first feedback message is transmitted.

In one embodiment, the first timer is not yet started before the first feedback message is transmitted.

In one embodiment, along with transmission of the first feedback message, the first node U01 starts the first timer.

In one embodiment, along with transmission of the first feedback message, the first node U01 starts the first timer.

In one embodiment, the step S5103 is performed later than the step S5102, and after the step S5102 and before the step S5103 neither a radio link failure (RLF) other than the radio link handover failure (HOF) nor a switch failure has been detected.

In one embodiment, the step S5103 is performed later than the step S5102, and after the step S5102 and before the first timer is expired, the first timer hasn't been restarted yet.

In one embodiment, in response to expiration of the first timer, the first node U01 determines a radio link handover failure in step S5103; the expiration of the first timer corresponds to the step S5102 of starting the first timer.

In one subembodiment, the radio link handover failure refers to failing to switch from the first radio link to the second radio link before the first timer is expired.

In one embodiment, the action performed by the first node of RRC re-establishment includes at least the step S5104 of transmitting an RRC re-establishment request.

In one embodiment, the RRC re-establishment is a RRCReestablishmentRequest message.

In one embodiment, the RRC re-establishment is a RRCConnectionReestablishmentRequest message.

In one embodiment, the action performed by the first node of RRC re-establishment is for the second node U02.

In one embodiment, the RRC re-establishment request is for the second node U02.

In one embodiment, the RRC re-establishment request is directly transmitted to the second node U02 without being relayed.

In one embodiment, the RRC re-establishment request is transmitted to the second node U02 via relaying of the third node U03.

In one embodiment, the RRC re-establishment command request is transmitted to the first node U01 via relaying of the third node U03.

In one embodiment, the RRC re-establishment request comprises an identity of the second node U02.

In one embodiment, the RRC re-establishment request comprises an identity of the first node U01.

In one embodiment, the RRC re-establishment request is transmitted by a direct path.

In one embodiment, the RRC re-establishment request is transmitted by an indirect path.

In one embodiment, the RRC re-establishment signaling is RRCReestablishment.

In one embodiment, the RRC re-establishment signaling is RRCConnectionReestablishment.

In one embodiment, the RRC re-establishment signaling is RRCSetup.

In one embodiment, the RRC re-establishment signaling is RRCConnectionSetup.

In one embodiment, the RRC re-establishment request and the RRC re-establishment signaling both use a direct path for transmission, or both use an indirect path for transmission.

In one embodiment, one of the RRC re-establishment request and the RRC re-establishment signaling uses a direct path for transmission while the other uses an indirect path for transmission.

In one embodiment, after receiving the RRC re-establishment signaling the first node U01 transmits an RRC re-establishment complete message, where the RRC re-establishment complete message is used for acknowledging completion of the RRC re-establishment.

In one subembodiment, the RRC re-establishment complete message comprises RRCSetupComplete.

In one subembodiment, the RRC re-establishment complete message comprises RRCReconfigurationComplete.

In one subembodiment, the RRC re-establishment complete message indicates that there is available/valid failure information.

In one subembodiment, when information about the radio link handover failure is still available or valid, the RRC re-establishment complete message comprises an indication of the presence of available/valid failure information.

In one subembodiment, the RRC re-establishment complete message comprises UE-MeasurementsAvailable, the UE-MeasurementsAvailable indicating the presence of radio link handover failure (HOF) information.

In one subembodiment, the RRC re-establishment complete message comprises rlf-InfoAvailable, the rlf-InfoAvailable indicating the presence of radio link handover failure (HOF) information.

In one subembodiment, when the first node U01 has or stores information about the radio link handover failure, the RRC re-establishment message comprises rlf-InfoAvailable.

In one embodiment, the first node receives a first information request message, the first information request message comprising a rlf-ReportReq, and as a response to receiving the first information request message, the first node U01 transmits the first message.

In one subembodiment, the first information request message is a UEInformationRequest.

In one embodiment, the first message is transmitted after completing the RRC re-establishment.

In one embodiment, the first message is transmitted after completing the RRC re-establishment triggered by the RRC Re-establishment.

In one embodiment, the first message is transmitted to the second node U02 via relaying of the third node U03.

In one embodiment, the first message is directly transmitted to the second node U02.

In one embodiment, the second message is a message on a base station-to-base station interface.

In one subembodiment, the base station-to-base station interface is or includes an Xn interface.

In one subembodiment, the base station-to-base station interface is or includes an X2 interface.

In one embodiment, the second message is a message on a base station-to-core network interface.

In one subembodiment, the base station-to-core network interface is or includes an S1.

In one subembodiment, the base station-to-core network interface is or includes an N3.

In one subembodiment, the base station-to-core network interface is or includes an N2.

In one embodiment, the second message isn't an RRC message.

In one embodiment, the second message is a NAS message.

In one embodiment, a receiver of the second message is a cell.

In one embodiment, a receiver of the second message is a core network device.

In one embodiment, a receiver of the second message is a neighboring cell of the first node U01.

In one embodiment, the second message is or comprises a handover report.

In one embodiment, the second message is or comprises a HO report.

In one embodiment, the second message is or comprises a RLF report.

In one embodiment, the second message is or comprises a UE RLF report container.

In one embodiment, the second message is or comprises a FAILURE INDICATION.

In one embodiment, the first message is used for generating the second message.

In one embodiment, the second message comprises information about the radio link handover failure.

In one embodiment, the second message comprises information about the radio link handover failure coming from the first message.

In one embodiment, the second message is used to indicate the radio link handover failure.

In one embodiment, the second message is used to indicate that the radio link handover failure is related to relay.

In one embodiment, the second message comprises an identity of the second node U02.

In one embodiment, the second message comprises an identity of the third node U03.

In one subembodiment, the identity of the third node U03 is an identity of a Uu interface of the third node U03.

In one subembodiment, the identity of the third node U03 is a C-RNTI of the third node U03.

In one subembodiment, the identity of the third node U03 is an identity of a NAS of the third node U03.

In one subembodiment, the identity of the third node U03 is a sidelink-related identity of the third node U03.

In one subembodiment, the identity of the third node U03 is an identity for paging of the third node U03.

In one embodiment, the second message indicates whether the second radio link is a direct path or an indirect path.

In one embodiment, the second message indicates that the radio link handover failure is a path switch failure.

In one embodiment, the second message indicates a serving cell of the third node U03.

In one embodiment, the second message indicates a PLMN of the third node U03.

In one embodiment, the second message indicates a tracking area of the third node U03.

Embodiment 6

Figure 6:
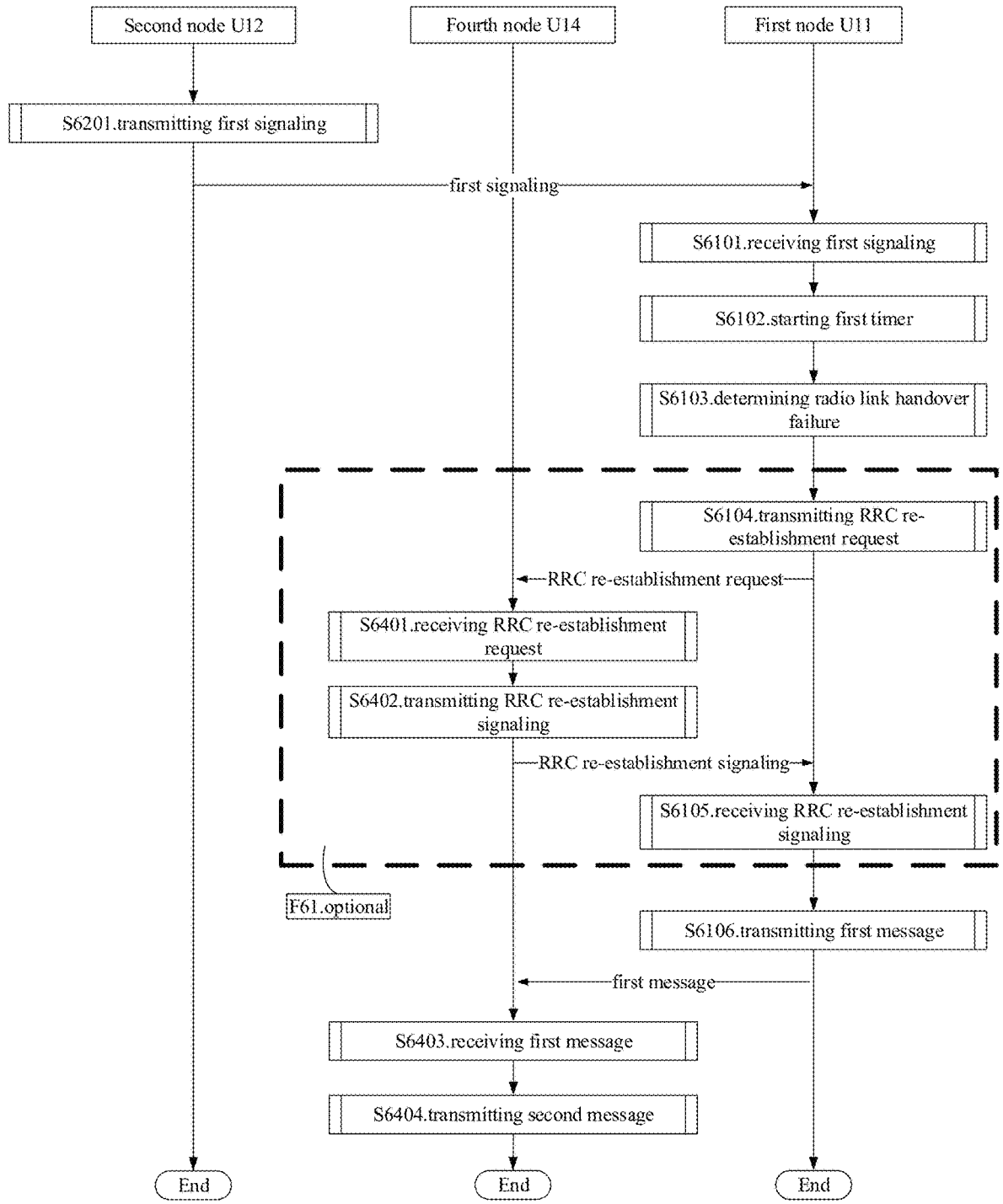
FIG. 6 illustrates a flowchart of radio signal transmission according to one embodiment of the present application.

Embodiment 6 illustrates a flowchart of signal transmission according to one embodiment of the present application, as shown in FIG. 6. In FIG. 6, U11 corresponds to a first node in the present application while U12 corresponds to a second node in the present application, and a fourth node U14 is a node other than the second node U12; it should be particularly noted that the sequential order presented herein does not restrict the orders of signal transmission and implementations in this present application, where Embodiment 6 is based on Embodiment 5, so that things needed but not shown by Embodiment 6 can refer to Embodiment 5; steps given in F61 are optional, and the step S6404 is optional, too.

The first node U11 receives a first signaling in step S6101; starts a first timer in step S6102; determines a radio link handover failure in step S6103; transmits an RRC re-establishment request in step S6104; and receives an RRC re-establishment signaling in step S6105; and transmits a first message in step S6106.

The second node U12 transmits a first signaling in step S6201.

The fourth node U14 receives an RRC re-establishment request in step S6401; transmits an RRC re-establishment signaling in step S6402; receives a first message in step S6403; and transmits a second message in step S6404.

In one embodiment, the fourth node U14 is a base station.

In one embodiment, the fourth node U14 is a gNB.

In one embodiment, the fourth node U14 is a cell.

In one embodiment, the fourth node U14 is a neighbor cell of the first node U11.

In one embodiment, the fourth node U14 is a serving cell of a relay comprised in the second radio link indicated by the first signaling.

In one embodiment, the fourth node U14 is a primary cell (PCell) of a relay comprised in the second radio link indicated by the first signaling.

In one embodiment, the fourth node U14 is a cell for which the second radio link indicated by the first signaling is targeted.

In one embodiment, the fourth node U14 is a target cell indicated by the first signaling.

In one embodiment, the RRC re-establishment of the first node U11 includes at least transmitting an RRC re-establishment request message.

In one embodiment, the RRC re-establishment of the first node U11 is for the fourth node U14.

In one embodiment, the RRC re-establishment request is directly transmitted to the fourth node U14 without being relayed.

In one embodiment, the RRC re-establishment request is transmitted to the fourth node U14 via relay.

In one embodiment, the RRC re-establishment command request is transmitted to the first node U11 via relay.

In one embodiment, the RRC re-establishment command is directly transmitted to the first node U11 without being relayed.

In one embodiment, the RRC re-establishment request comprises an identity of the second node U12.

In one embodiment, after receiving the RRC re-establishment signaling the first node U11 transmits an RRC re-establishment complete message, where the RRC re-establishment complete message is used for acknowledging completion of the RRC re-establishment.

In one subembodiment, the RRC re-establishment complete message comprises RRCSetupComplete.

In one subembodiment, the RRC re-establishment complete message comprises RRCReconfigurationComplete.

In one subembodiment, the RRC re-establishment complete message indicates that there is available/valid failure information.

In one subembodiment, when information about the radio link handover failure is still available or valid, the RRC re-establishment complete message comprises an indication of the presence of available/valid failure information.

In one subembodiment, the RRC re-establishment complete message comprises UE-MeasurementsAvailable, the UE-MeasurementsAvailable indicating the presence of radio link handover failure (HOF) information.

In one subembodiment, the RRC re-establishment complete message comprises rlf-InfoAvailable, the rlf-InfoAvailable indicating the presence of radio link handover failure (HOF) information.

In one subembodiment, when the first node U11 has or stores information about the radio link handover failure, the RRC re-establishment message comprises rlf-InfoAvailable.

In one embodiment, the first message is transmitted after completing the action of RRC re-establishment of the first node.

In one embodiment, the first message is transmitted after completing the RRC re-establishment triggered by the action of RRC Re-establishment of the first node.

In one embodiment, the first message is transmitted to the fourth node U14 via relay.

In one embodiment, the first message is directly transmitted to the fourth node U14 without relay.

In one embodiment, the second message is a message on a base station-to-base station interface.

In one subembodiment, the base station-to-base station interface is or includes an Xn interface.

In one subembodiment, the base station-to-base station interface is or includes an X2 interface.

In one embodiment, the second message is a message on a base station-to-core network interface.

In one subembodiment, the base station-to-core network interface is or includes an S1.

In one subembodiment, the base station-to-core network interface is or includes an N3.

In one subembodiment, the base station-to-core network interface is or includes an N2.

In one embodiment, the second message isn't an RRC message.

In one embodiment, the second message is a NAS message.

In one embodiment, a receiver of the second message is a cell.

In one embodiment, a receiver of the second message is the second node U12.

In one embodiment, a receiver of the second message is a core network device.

In one embodiment, the fourth node U14 and the second node U12 belong to a same PLMN or operator.

In one embodiment, the fourth node U14 and the second node U12 are connected to a same core network.

In one embodiment, the fourth node U14 and the second node U12 are connected to a same AMF.

In one embodiment, a receiver of the second message is a neighboring cell of the first node U11.

In one embodiment, a receiver of the second message is the second node U12.

In one embodiment, the second message is or comprises a handover report.

In one embodiment, the second message is or comprises a HO report.

In one embodiment, the second message is or comprises a RLF report.

In one embodiment, the second message is or comprises a UE RLF report container.

In one embodiment, the second message is or comprises a FAILURE INDICATION.

In one embodiment, the first message is used for generating the second message.

In one embodiment, the second message comprises information about the radio link handover failure.

In one embodiment, the second message comprises information about the radio link handover failure coming from the first message.

In one embodiment, the second message is used to indicate the radio link handover failure.

In one embodiment, the second message is used to indicate that the radio link handover failure is related to relay.

In one embodiment, the second message comprises an identity of the second node U12.

In one embodiment, the second message comprises an identity of a relay of the first node U11.

In one subembodiment, the relay of the first node U11 is a L2 U2N relay UE.

In one subembodiment, the relay of the first node U11 is a L2 U2N relay.

In one subembodiment, the relay of the first node U11 is a relay comprised in the second radio link.

In one subembodiment, the identity of the relay of the first node U11 is a relay of a Uu interface.

In one subembodiment, the identity of the relay of the first node U11 is a C-RNTI.

In one subembodiment, the identity of the relay of the first node U11 is an identity of a NAS.

In one subembodiment, the identity of the relay of the first node U11 is a sidelink-related identity.

In one subembodiment, the identity of the relay of the first node U11 is an identity for paging.

In one embodiment, the second message indicates whether the second radio link is a direct path or an indirect path.

In one embodiment, the second message indicates that the radio link handover failure is a path switch failure.

In one embodiment, the second message indicates at least one of a serving cell, a PLMN, a tracking area, or a PCell of a relay of the first node U11.

In one subembodiment, the relay of the first node U11 is a L2 U2N relay UE.

In one subembodiment, the relay of the first node U11 is a L2 U2N relay.

In one subembodiment, the relay of the first node U11 is a relay comprised in the second radio link.

Embodiment 7

Figure 7:
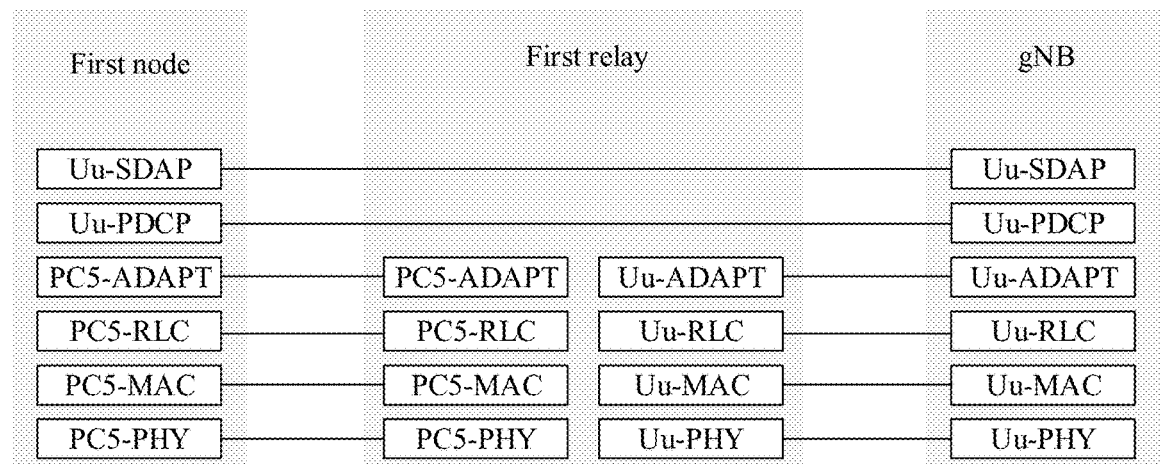
FIG. 7 illustrates a schematic diagram of a protocol stack of relay communications according to one embodiment of the present application.
Figure 7:
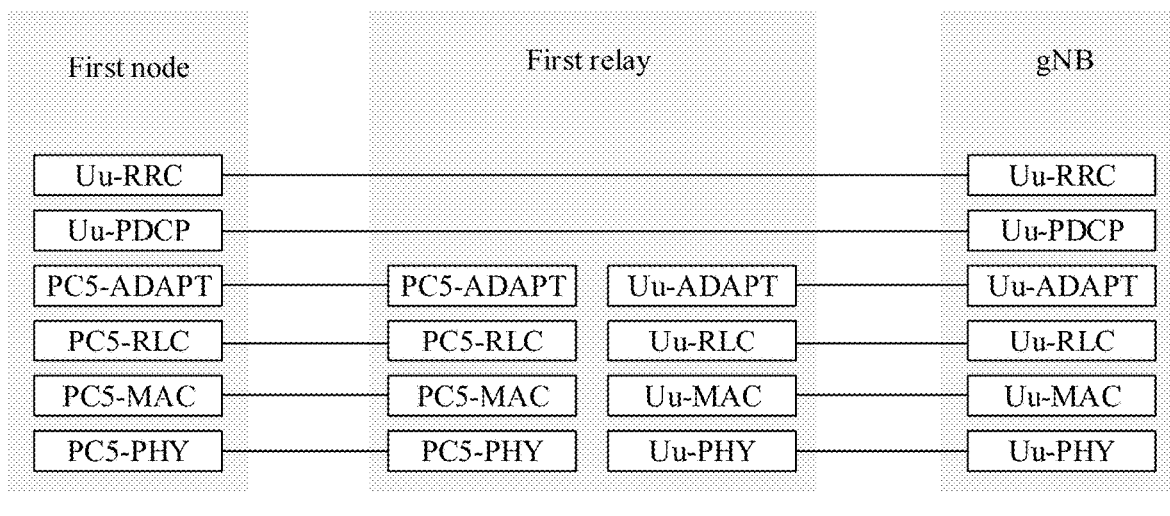

Embodiment 7 illustrates a schematic diagram of a protocol stack of relay communications according to one embodiment of the present application, as shown in FIG. 7.

The protocol stack shown in FIG. 7 is applicable to L2 U2N relay communications, with Embodiment 3 as the foundation of Embodiment 7.

Part (a) in FIG. 7 corresponds to a user plane protocol stack in L2 U2N relay communications; (b) in FIG. 7 corresponds to a control plane protocol stack in L2 U2N relay communications.

The relay in FIG. 7 is a relay node.

In one embodiment, the relay in FIG. 7 is a L2 U2N relay.

In one embodiment, the relay in FIG. 7 is a L2 U2N relay UE.

In one embodiment, the relay in FIG. 7 is a L2 relay.

In one embodiment, the relay in FIG. 7 is a U2N relay UE.

In one embodiment, the relay in FIG. 7 is a relay comprised in the second radio link indicated by the first signaling In one embodiment, the relay in FIG. 7 is a relay comprised in the second radio link indicated by the first signaling, the second radio link being an indirect path.

In one embodiment, the gNB shown in FIG. 7 corresponds to the second node in the present application.

In Embodiment 7, a PC5 interface is an interface between the first node and the relay, where protocol entities related to the PC5 interface {PC5-ADAPT, PC5-RLC, PC5-MAC, PC5-PHY} terminate at the first node and the relay; a Uu interface is an interface between a UE and a gNB, where protocol entities of the Uu interface respectively terminate at the UE and the gNB.

In one embodiment, the first node and the relay are UEs.

In one embodiment, the relay shown in FIG. 7 corresponds to the third node U03 in Embodiment 5.

In one embodiment, the gNB shown in FIG. 7 corresponds to the second node in the present application.

In one embodiment, the gNB shown in FIG. 7 is a transmitter of the first signaling In one embodiment, protocol entities of a Uu interface {Uu-ADAPT, Uu-RLC, Uu-MAC, Uu-PHY} terminate at the relay and the gNB.

In one embodiment, as shown in (a), protocol entities of a Uu interface {Uu-SDAP, Uu-PDCP} terminate at the first node and the gNB; an SDAP PDU and a PDCP PDU of the first node are forwarded by the relay, but the relay does not modify the SDAP PDU and the PDCP PDU, which means that the SDAP PDU and the PDCP PDU transmitted to the gNB by the first node are transparent to the relay.

In one embodiment, as shown in (b), protocol entities of a Uu interface {Uu-RRC, Uu-PDCP} terminate at the first node and the gNB; an RRC PDU and a PDCP PDU of the first node are forwarded by the relay, but the relay does not modify the RRC PDU and the PDCP PDU, which means that the RRC PDU and the PDCP PDU transmitted to the gNB by the first node are transparent to the relay.

In one embodiment, as shown in (a), PC5-ADAPT corresponds to AP358 in FIG. 3, PC5-RLC corresponds to RLC353 in FIG. 3, PC5-MAC corresponds to MAC352 in FIG. 3, and PC5-PHY corresponds to PHY351 in FIG. 3.

In one embodiment, as shown in (a), Uu-SDAP corresponds to SDAP356 in FIG. 3, and Uu-PDCP corresponds to PDCP354 in FIG. 3.

In one embodiment, as shown in (b), PC5-ADAPT corresponds to AP308 in FIG. 3, PC5-RLC corresponds to RLC303 in FIG. 3, PC5-MAC corresponds to MAC302 in FIG. 3, and PC5-PHY corresponds to PHY301 in FIG. 3.

In one embodiment, as shown in (b), Uu-RRC corresponds to RRC306 in FIG. 3, and Uu-PDCP corresponds to PDCP304 in FIG. 3.

In one embodiment, a cell of the gNB in FIG. 7 is a serving cell of the relay, the relay being in a non-RRC connected state.

In one embodiment, a cell of the gNB in FIG. 7 is a PCell of the relay, the relay being in an RRC connected state.

In one embodiment, a cell of the gNB in FIG. 7 is a camped cell of the relay.

In one embodiment, a cell of the gNB in FIG. 7 is a suitable cell of the relay.

In one embodiment, a cell of the gNB in FIG. 7 is a cell selected by the relay.

In one embodiment, a cell of the gNB in FIG. 7 is a camped cell of the first node.

In one embodiment, a cell of the gNB in FIG. 7 is a suitable cell of the first node.

In one embodiment, a cell of the gNB in FIG. 7 is a cell selected by the first node.

In one embodiment, a PC5-ADAPT is only used for a specific RB or message or specific data.

In one subembodiment, when the relay forwards system information, the PC5-ADAPT layer is not used.

In one embodiment, as shown in FIG. 7, communications between the first node and the gNB use an indirect path.

In one embodiment, the first signaling is generated by Uu-RRC of the gNB given in FIG. 7(b) and received by Uu-RRC of the first node.

In one embodiment, the first signaling is transparent to the relay.

In one embodiment, the first signaling uses a direct path for transmission.

In one embodiment, when using an indirect path, Uu-PDCP of the first node is associated with PC5-RLC, or is associated with PC5-RLC via PC5-ADAPT.

In one embodiment, when using a direct path, the first node will establish Uu-RLC, and Uu-PDCP of the first node is associated with the Uu-RLC.

In one subembodiment, after switching to the direct path, the first node releases PC5-RLC.

In one subembodiment, after switching to the direct path, the first node releases PC5-ADAPT.

In one subembodiment, after switching to the direct path, the first node releases PC5-MAC and PC5-PHY.

In one subembodiment, after switching to the direct path, the first node no longer uses PC5-ADAPT.

In one subembodiment, after switching to the direct path, there is no other protocol layer between Uu-PDCP and Uu-RLC of the first node.

Embodiment 8

Figure 8:
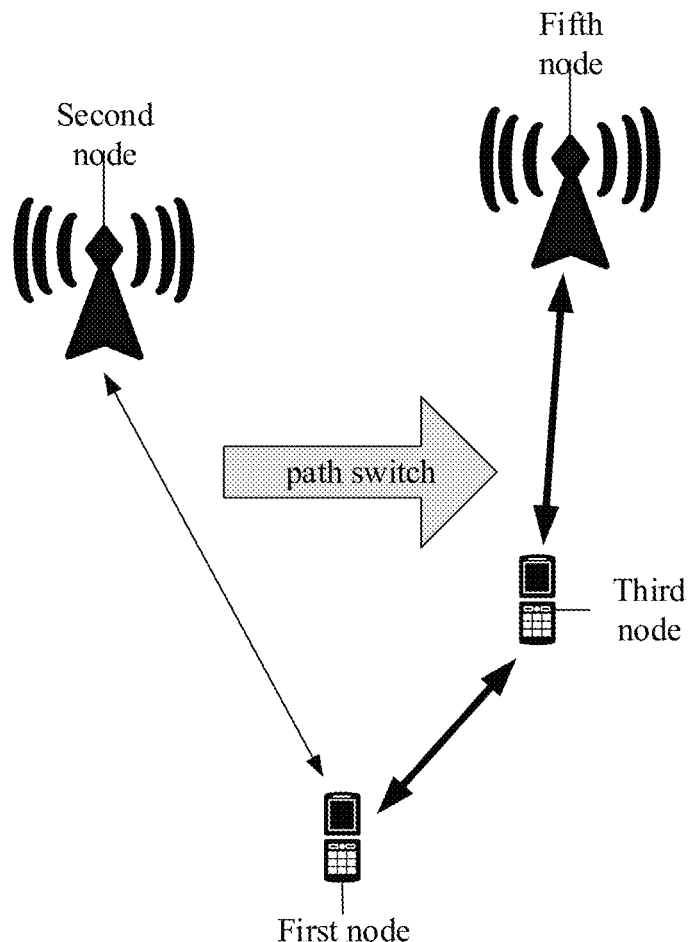
FIG. 8 illustrates a schematic diagram of radio link handover according to one embodiment of the present application.

Embodiment 8 illustrates a schematic diagram of radio link handover according to one embodiment of the present application, as shown in FIG. 8.

FIG. 8 is provided for a case where the second radio link is an indirect path.

The first node in FIG. 8 corresponds to the first node in the present application; the second node in FIG. 8 corresponds to the second node in the present application; the third node in FIG. 8 is a relay comprised in the second radio link.

In one embodiment, the third node is a UE.

In one embodiment, the third node is a relay.

In one embodiment, the third node is a L2 relay.

In one embodiment, the third node is a L2 U2N relay UE.

In one embodiment, the third node is a U2N relay UE.

In one embodiment, the fifth node in FIG. 8 is the same as the second node, namely, they are the same node.

In one embodiment, the fifth node in FIG. 8 and the second node belong to a same CU.

In one embodiment, the fifth node in FIG. 8 and the second node belong to a same gNB.

In one embodiment, the fifth node in FIG. 8 is a node other than the second node.

In one subembodiment, the fifth node is a cell.

In one subembodiment, the fifth node is a cell group.

In one subembodiment, the fifth node is a base station.

In one subembodiment, the fifth node is a gNB.

In one embodiment, the first radio link in the present application is a radio link between the first node and the second node.

In one embodiment, the second radio link in the present application is a radio link between the first node and the fifth node.

In one embodiment, the second radio link includes a sidelink between the first node and the third node, as well as a radio link between the third node and the fifth node.

In one embodiment, the relay comprised in the second radio link refers to a relay used for transmitting data with the second radio link.

In one embodiment, the relay comprised in the second radio link refers to using a relay in a sidelink comprised in the second radio link.

In one embodiment, the relay comprised in the second radio link refers to that the second radio link is an indirect path, and a relay in the indirect path is the relay of the second radio link.

In one embodiment, the relay comprised in the second radio link refers to the third node in FIG. 8.

In one embodiment, transiting from the first radio link to the second radio link includes starting to use the third node.

In one embodiment, the action performed by the first node of RRC re-establishment includes an RRC re-establishment for the second node.

In one embodiment, the action performed by the first node of RRC re-establishment includes an RRC re-establishment for the fifth node.

Embodiment 9

Figure 9:
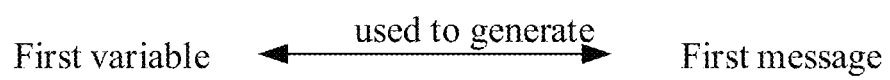
FIG. 9 illustrates a schematic diagram of a first variable being used for generating a first message according to one embodiment of the present application.

Embodiment 9 illustrates a schematic diagram of a first variable being used for generating a first message according to one embodiment of the present application, as shown in FIG. 9.

In one embodiment, the first variable is a VarRLF-Report.

In one embodiment, the first message comprises a UEInformationResponse.

In one embodiment, the phrase of a first variable being used for generating a first message includes that information related to the radio link handover failure which is valid is stored in the first variable, and the first node sets a value of a field timeSinceFailure comprised in the first variable to an elapsed time since the radio link handover failure.

In one subembodiment, an RPLMN is comprised in a plmn-IdentityList of the first variable.

In one embodiment, the phrase of a first variable being used for generating a first message includes that information used to indicate the radio link handover failure which is valid is stored in the first variable, and the first node sets a value of a field timeSinceFailure comprised in the first variable to an elapsed time since the radio link handover failure.

In one subembodiment, an RPLMN is comprised in a plmn-IdentityList of the first variable.

In one embodiment, the phrase of a first variable being used for generating a first message includes that information of path switch failure which is valid is stored in the first variable, and the first node sets a value of a field timeSinceFailure comprised in the first variable to an elapsed time since the radio link handover failure.

In one subembodiment, the failure information of the radio link handover failure is the information of path switch failure.

In one subembodiment, an RPLMN is comprised in a plmn-IdentityList of the first variable.

In one subembodiment, an RPLMN is comprised in a plmn-IdentityList of the first variable.

In one embodiment, the phrase of a first variable being used for generating a first message includes that first failure information which is valid is stored in the first variable, and the first node sets a value of a field timeSinceFailure comprised in the first variable to an elapsed time since the radio link handover failure.

In one subembodiment, the failure information of the radio link handover failure is the first failure information.

In one subembodiment, an RPLMN is comprised in a plmn-IdentityList of the first variable.

In one embodiment, the phrase of a first variable being used for generating a first message includes that failedPCellId-EUTRA comprised in a rlf-Report field in the first message is set to a first value to indicates a PCell of the first node or a transmitter of the first signaling or a cell where the radio link handover failure is found.

In one embodiment, the phrase of a first variable being used for generating a first message includes that measResult-RLF-Report-EUTRA comprised in the first message is set to a value of a rlf-Report of the first variable.

In one embodiment, the phrase of a first variable being used for generating a first message includes that a rlf-Report comprised in the first message is set to a value of a rlf-Report of the first variable.

In one embodiment, the phrase of a first variable being used for generating a first message includes that a rlf-Report field comprised in the first message is set to a value of a rlf-Report field of the first variable.

In one embodiment, the phrase of a first variable being used for generating a first message includes that a value of a rlf-Report field comprised in the first message is set to a value of a rlf-Report field of the first variable.

In one embodiment, the first node stores information related to the radio link handover failure in a rlf-Report field of the first variable.

In one embodiment, in response to the expiration of the first timer, the first node stores information related to the radio link handover failure in a rlf-Report field of the first variable.

In one embodiment, the phrase of a first variable being used for generating a first message includes that once a lower layer of the first node acknowledges a successful transmission of the first message, the first node drops a rlf-Report in the first variable.

Embodiment 10

Figure 10:
FIG. 10 illustrates a schematic diagram of a second field being used to indicate that radio link handover failure is related to relay according to one embodiment of the present application.

Embodiment 10 illustrates a schematic diagram of a second field being used to indicate that radio link handover failure is related to relay according to one embodiment of the present application, as shown in FIG. 10.

In one embodiment, the second field in the first message belongs to a RLF-Report field.

In one embodiment, the second field in the first message is a RLF-Report field in the first message.

In one embodiment, the first message comprises a RLF-Report field, and the RLF-Report field comprised in the first message comprises the second field.

In one embodiment, the second field indicates a path switch.

In one embodiment, the second field indicates the use of relay.

In one embodiment, the second field indicates an indirect path.

In one embodiment, the second field indicates a type of the second radio link.

In one embodiment, the second field indicates a relay comprised in the second radio link.

In one embodiment, the second field indicates a state of a relay comprised in the second radio link.

In one embodiment, the second field indicates an identity of a relay comprised in the second radio link.

In one embodiment, the second field indicates a sidelink measurement result.

In one embodiment, the second field indicates a cause for the radio link handover failure, the cause for the radio link handover failure being a cause other than RLF or HOF.

In one embodiment, the second field indicates a first timer, the first timer being a timer other than T304.

In one embodiment, names of the second field include relay.

In one embodiment, names of the second field include path.

In one embodiment, names of the second field include switch.

In one embodiment, the second field is a rlf-Cause.

In one embodiment, the second field is a hof-Cause.

In one embodiment, the second field is an other-Cause.

Embodiment 11

Figure 11:
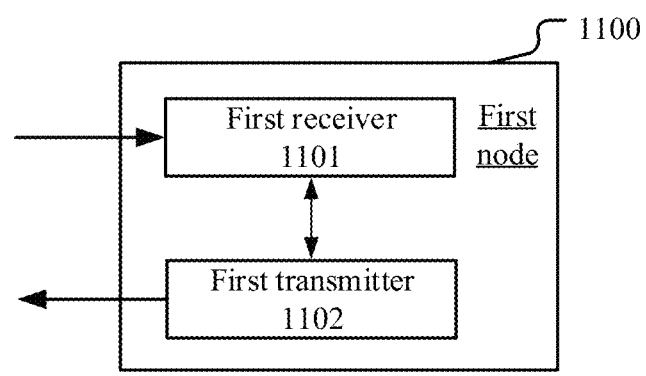
FIG. 11 illustrates a structure block diagram of a processing device in a first node according to one embodiment of the present application.

Embodiment 11 illustrates a structure block diagram of a processing device used in a first node according to one embodiment of the present application; as shown in FIG. 11. In FIG. 11, a processing device 1100 in the first node comprises a first receiver 1101 and a first transmitter 1102. In Embodiment 11, the first receiver 1101 receives a first signaling, the first signaling being used to indicate a transition from a first radio link to a second radio link; the first radio link is a direct path; the first signaling is used for configuring a first timer;

the first receiver 1101, in response to expiration of the first timer, determines a radio link handover failure and initiates an RRC re-establishment; and the first transmitter 1102 transmits a first message;

herein, a format of the first message and the first timer are respectively related to whether the second radio link is a direct path or an indirect path; the first signaling is an RRC message using an SRB; the first message is an RRC message using an SRB; the first message comprises at least a first identity; transmitting the first message is later than the expiration of the first timer; when the second radio link is a direct path, the first message uses a first format, when the second radio link is an indirect path, the first message uses a second format; the first format and the second format are respectively used to indicate the radio link handover failure (HOF); the indirect path is in communication with the network via relay; the direct path is in communication with the network without relay; when the second radio link is a direct path, the first timer is T304, when the second radio link is an indirect path, the first timer is a timer other than T304.

In one embodiment, the second format of the first message indicates that the radio link handover failure is related to relay.

In one embodiment, the first signaling comprises reconfigurationWithSync field.

In one embodiment, the first receiver 1101, in response to the expiration of the first timer, stores first failure information in a first variable; the first variable is used for generating the first message; the first failure information is information about the radio link handover failure (HOF).

In one embodiment, the second radio link is an indirect path; the second format of the first message comprises first failure information, the first failure information comprising at least one of {a first failure cause, an identity of a first relay, a measurement result of a first relay, a state of a first relay, an indication of whether a PC5 connection is established to a first relay, an indication of whether an RRC connection is established to a first relay, a state of a second timer, a measurement result of a serving cell of a first relay, a cause for expiration of the first timer, whether a sidelink communication failure related to a first relay occurs};

where the first failure cause is a cause other than RLF or HOF; the first relay is a relay comprised in the second radio link indicated by the first signaling.

In one embodiment, the second format of the first message does not comprise a nrFailedPCellId field, and the second format of the first message not comprising the nrFailedPCellId field is used for indicating that the radio link HOF is related to relay.

In one embodiment, the second radio link is an indirect path; the second format of the first message comprises a nrFailedPCellId field, and the nrFailedPCellId field comprised in the second format of the first message indicates an identity of a first relay, the first relay being a relay comprised in the second radio link indicated by the first signaling.

In one embodiment, the first format and the second format of the first message both comprise a first field, the first field indicating a HOF, and the second format of the first message comprises a second field, the second field being used to indicate that the radio link HOF is related to relay; the first format of the first message does not comprise the second field.

In one embodiment, the first node is a UE.

In one embodiment, the first node is a terminal supporting large delay difference.

In one embodiment, the first node is a terminal supporting NTN.

In one embodiment, the first node is an aircraft.

In one embodiment, the first node is a U2N remote UE.

In one embodiment, the first node is a cellphone.

In one embodiment, the first node is a vehicle-mounted terminal.

In one embodiment, the first node is a relay.

In one embodiment, the first node is a vessel.

In one embodiment, the first node is an IoT terminal.

In one embodiment, the first node is an IIoT terminal.

In one embodiment, the first node is a piece of equipment supporting transmissions with low delay and high reliability.

In one embodiment, the first node is a sidelink communication node.

In one embodiment, the first receiver 1101 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1102 comprises at least one of the antenna 452, the transmitter 454, the transmitting processor 468, the multi-antenna transmitting processor 457, the controller/processor 459, the memory 460 or the data source 467 in Embodiment 4.

Embodiment 12

Figure 12:
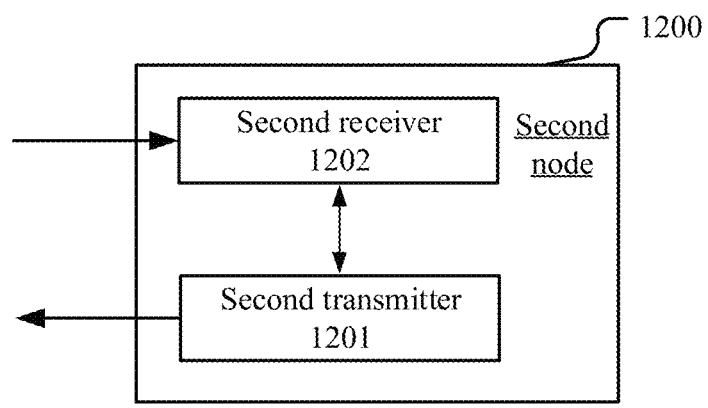
FIG. 12 illustrates a structure block diagram of a processing device in a second node according to one embodiment of the present application.

Embodiment 12 illustrates a structure block diagram of a processing device used in a second node according to one embodiment of the present application; as shown in FIG. 12. In FIG. 12, a processing device 1200 in a second node comprises a second transmitter 1201 and a second receiver 1202. In Embodiment 12, the second transmitter 1201 transmits a first signaling, the first signaling being used to indicate a transition from a first radio link to a second radio link; the first radio link is a direct path; the first signaling is used for configuring a first timer;

a receiver of the first signaling, in response to expiration of the first timer, determining a radio link handover failure and initiating an RRC re-establishment; and The second receiver 1202 receives a first message;

herein, a format of the first message and the first timer are respectively related to whether the second radio link is a direct path or an indirect path; the first signaling is an RRC message using an SRB; the first message is an RRC message using an SRB; the first message comprises at least a first identity; transmitting the first message is later than the expiration of the first timer; when the second radio link is a direct path, the first message uses a first format, when the second radio link is an indirect path, the first message uses a second format; the first format and the second format are respectively used to indicate the radio link handover failure (HOF); the indirect path is in communication with the network via relay; the direct path is in communication with the network without relay; when the second radio link is a direct path, the first timer is T304, when the second radio link is an indirect path, the first timer is a timer other than T304.

In one embodiment, the second format of the first message indicates that the radio link handover failure is related to relay.

In one embodiment, the first signaling comprises reconfigurationWithSync field.

In one embodiment, the second radio link is an indirect path; the second format of the first message comprises first failure information, the first failure information comprising at least one of {a first failure cause, an identity of a first relay, a measurement result of a first relay, a state of a first relay, an indication of whether a PC5 connection is established to a first relay, an indication of whether an RRC connection is established to a first relay, a state of a second timer, a measurement result of a serving cell of a first relay, a cause for expiration of the first timer, whether a sidelink communication failure related to a first relay occurs};

where the first failure cause is a cause other than RLF or HOF; the first relay is a relay comprised in the second radio link indicated by the first signaling.

In one embodiment, the second format of the first message does not comprise a nrFailedPCellId field, and the second format of the first message not comprising the nrFailedPCellId field is used for indicating that the radio link HOF is related to relay.

In one embodiment, the second radio link is an indirect path; the second format of the first message comprises a nrFailedPCellId field, and the nrFailedPCellId field comprised in the second format of the first message indicates an identity of a first relay, the first relay being a relay comprised in the second radio link indicated by the first signaling.

In one embodiment, the first format and the second format of the first message both comprise a first field, the first field indicating a HOF, and the second format of the first message comprises a second field, the second field being used to indicate that the radio link HOF is related to relay; the first format of the first message does not comprise the second field.

In one embodiment, the second transmitter 1201 transmits a second message, the second message being used to indicate the radio link handover failure.

In one embodiment, the second node is a satellite.

In one embodiment, the second node is an IoT node.

In one embodiment, the second node is a relay.

In one embodiment, the second node is a U2N relay UE.

In one embodiment, the second node is an access point.

In one embodiment, the second node is a base station.

In one embodiment, the second transmitter 1201 comprises at least one of the antenna 420, the transmitter 418, the transmitting processor 416, the multi-antenna transmitting processor 471, the controller/processor 475 or the memory 476 in Embodiment 4.

In one embodiment, the second receiver 1202 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, satellite communication equipment, ship communication equipment, and NTN UE, etc. The base station or system device in the present application includes but is not limited to macro-cellular base stations, micro-cellular base stations, home base stations, relay base station, gNB (NR node B), Transmitter Receiver Point (TRP), NTN base station, satellite equipment and fight platform, and other radio communication equipment.

This application can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first node for wireless communications, comprising:
a first receiver receiving a first signaling that indicates a transition from a first radio link to a second radio link, wherein the first radio link is a first direct path and the first signaling configures a first timer; wherein the first receiver, in response to an expiration of the first timer, determines a radio link handover failure (HOF) and initiating an radio resource control (RRC) re-establishment; and
a first transmitter transmitting a first message after the expiration of the first timer;
wherein a format of the first message and the first timer respectively depend on whether the second radio link is a second direct path or an indirect path; the first signaling is a first RRC message using a first signaling radio bearer (SRB); the first message is a second RRC message using a second SRB; the first message comprises at least a first identity; when the second radio link is the second direct path, the first message uses a first format, when the second radio link is the indirect path, the first message uses a second format; the first format and the second format respectively indicate the radio link HOF; the indirect path is in communication with a network via a relay; the second direct path is in communication with the network without the relay; when the second radio link is the second direct path, the first timer is a T304 timer, and when the second radio link is the indirect path, the first timer is a timer other than the T304 timer.

2. The first node according to claim 1, wherein along with reception or performance of the first signaling, the first node starts the first timer.

3. The first node according to claim 2, wherein the second format of the first message indicates a relationship between the radio link HOF and the relay.

4. The first node according to claim 2, wherein the first signaling comprises a reconfigurationWithSync field.

5. The first node according to claim 3,
wherein the first receiver, in response to the expiration of the first timer, stores first failure information in a first variable; the first message is generated based on the first variable; and the first failure information describes the radio link HOF.

6. The first node according to claim 4, wherein the second radio link is the indirect path; the second format of the first message comprises first failure information comprising at least one of a first failure cause, an identity of a first relay, a measurement result of the first relay, a state of the first relay, an indication of whether a PC5 connection has been established to the first relay, an indication of whether an RRC connection is-has been established to the first relay, a state of a second timer, a measurement result of a serving cell of the first relay, a cause for expiration of the first timer, whether a sidelink communication failure associated with the first relay has occurred; wherein the first failure cause is a cause other than a radio link failure (RLF) or the radio link HOF; and the first relay is comprised in the second radio link indicated by the first signaling.

7. The first node according to claim 5, wherein the second radio link is the indirect path; the second format of the first message includes first failure information comprising at least one of a first failure cause, an identity of a first relay, a measurement result of the first relay, a state of the first relay, an indication of whether a PC5 connection has been established to the first relay, an indication of whether an RRC connection has been established to the first relay, a state of a second timer, a measurement result of a serving cell of the first relay, a cause for the expiration of the first timer, whether a sidelink communication failure associated with the first relay has occurred; wherein the first failure cause is a cause other than a radio link failure (RLF) or the radio link HOF; and the first relay is comprised in the second radio link indicated by the first signaling.

8. The first node according to claim 2, wherein the second format of the first message does not comprise an nrFailedPCellId field, and the second format of the first message not comprising the nrFailedPCellId field indicates that the radio link HOF occurs in the relay.

9. The first node according to claim 7, wherein the second format of the first message does not comprise an nrFailedPCellId field, and the second format of the first message not comprising the nrFailedPCellId field indicates that the radio link HOF occurs in the relay.

10. The first node according to claim 1, wherein the second radio link is the indirect path; and the second format of the first message comprises an nrFailedPCellId field, and the nrFailedPCellId field comprised in the second format of the first message indicates an identity of a first relay that is comprised in the second radio link indicated by the first signaling.

11. The first node according to claim 7, wherein the second radio link is the indirect path; and the second format of the first message comprises an nrFailedPCellId field, and the nrFailedPCellId field comprised in the second format of the first message indicates an identity of a first relay that is comprised in the second radio link indicated by the first signaling.

12. The first node according to claim 1, wherein the first format and the second format of the first message both comprise a first field that indicates the radio link, and the second format of the first message comprises a second field that indicates the radio link HOF occurs in the relay; and the first format of the first message does not comprise the second field.

13. The first node according to claim 7, wherein the first format and the second format of the first message both comprise a first field that indicates the radio link HOF, and the second format of the first message comprises a second field that indicates a relationship between the radio link HOF and the relay; and the first format of the first message does not comprise the second field.

14. The first node according to claim 7, wherein the first failure information is stored in an rlf-Report field of the first variable, and the first variable being a VarRLF-Report.

15. The first node according to claim 2, wherein after the expiration of the first timer and before the first message is transmitted, the T304 timer is not expired.

16. The first node according to claim 7, wherein after the expiration of the first timer and before the first message is transmitted, the T304 timer is not expired.

17. The first node according to claim 7, wherein the first node is in an RRC connected state.

18. The first node according to claim 16, wherein the first node is in an RRC connected state.

19. A second node for wireless communications, comprising:
- a second transmitter transmitting a first signaling that indicates a transition from a first radio link to a second radio link, wherein the first radio link is a first direct path; and the first signaling configures a first timer;
- a first receiver of the first signaling, in response to an expiration of the first timer, determining a radio link handover failure (HOF) and initiating a radio resource control (RRC) re-establishment; and
- a second receiver receiving a first message after the expiration of the first timer;
- wherein a format of the first message and the first timer respectively depend on whether the second radio link is a second direct path or an indirect path; the first signaling is a first RRC message using a first signaling radio bearer (SRB); the first message is a second RRC message using a second SRB; the first message comprises at least a first identity; when the second radio link is the second direct path, the first message uses a first format, when the second radio link is the indirect path, the first message uses a second format; the first format and the second format respectively indicate the radio link HOF; the indirect path is in communication with a network via a relay; the second direct path is in communication with the network without the relay; when the second radio link is the second direct path, the first timer is a T304 timer, and when the second radio link is the indirect path, the first timer is a timer other than the T304 timer.

20. A method in a first node for wireless communications, comprising:
- receiving a first signaling that indicates a transition from a first radio link to a second radio link; wherein the first radio link is a first direct path; and wherein the first signaling configures a first timer;
- in response to an expiration of the first timer, determining a radio link handover failure (HOF) and initiating a radio resource control (RRC) re-establishment; and
- transmitting a first message after the expiration of the first timer;
- wherein a format of the first message and the first timer respectively depend on whether the second radio link is a second direct path or an indirect path; the first signaling is a first RRC message using a first signaling radio bearer (SRB); the first message is a second RRC message using a second SRB; the first message comprises at least a first identity; when the second radio link is the second direct path, the first message uses a first format, when the second radio link is the indirect path, the first message uses a second format; the first format and the second format respectively used to indicate the radio link HOF; the indirect path is in communication with a network via a relay; the second direct path is in communication with the network without the relay; when the second radio link is the second direct path, the first timer is a T304 timer, and when the second radio link is the indirect path, the first timer is a timer other than the T304 timer.

* * * * *